(12) United States Patent
Yamamoto et al.

(10) Patent No.: US 8,544,963 B2
(45) Date of Patent: Oct. 1, 2013

(54) BRAKING CONTROL APPARATUS

(75) Inventors: Takayuki Yamamoto, Toyota (JP);
Tetsuya Miyazaki, Toyota (JP);
Hiroyuki Matsubayashi, Toyota (JP);
Hiroaki Niino, Kariya (JP); Koichi Kokubo, Kariya (JP)

(73) Assignees: Toyota Jidosha Kabushiki Kaisha,
Toyota-shi (JP); Advics Co., Ltd.,
Kariya-shi (JP)

( * ) Notice: Subject to any disclaimer, the term of this patent is extended or adjusted under 35 U.S.C. 154(b) by 360 days.

(21) Appl. No.: 13/127,412

(22) PCT Filed: Sep. 25, 2009

(86) PCT No.: PCT/JP2009/004856
§ 371 (c)(1),
(2), (4) Date: May 3, 2011

(87) PCT Pub. No.: WO2011/036719
PCT Pub. Date: Mar. 31, 2011

(65) Prior Publication Data
US 2011/0210604 A1    Sep. 1, 2011

(51) Int. Cl.
*B60T 13/18*    (2006.01)
(52) U.S. Cl.
USPC ........................................ 303/11; 303/113.5
(58) Field of Classification Search
USPC ....... 303/3, 10, 11, 113.5, 113.1, 15; 701/70, 701/71
See application file for complete search history.

(56) References Cited

U.S. PATENT DOCUMENTS 6,315,369 B1    11/2001    Hirose

FOREIGN PATENT DOCUMENTS

| JP | 2000 168545 | 6/2000 |
|----|-------------|--------|
| JP | 2004 34729 | 2/2004 |
| JP | 2004 175283 | 6/2004 |
| JP | 2005 198478 | 7/2005 |
| JP | 2005 231396 | 9/2005 |
| JP | 2005 329892 | 12/2005 |

OTHER PUBLICATIONS

International Search Report Issued Dec. 22, 2009 in PCT/JP09/004856 filed Sep. 25, 2009.

*Primary Examiner* — Melanie Torres Williams
(74) *Attorney, Agent, or Firm* — Oblon, Spivak, McClelland, Maier & Neustadt, L.L.P.

(57) ABSTRACT

In a braking control apparatus, a plurality of pumps are driven by a common first motor. A brake supplies operating fluid to pipelines by operating the first motor, and controls opening/closing of a fluid pressure regulating valve so as to make the wheel cylinder pressure in the right front wheel approach the right front wheel target pressure, and controls opening closing of a fluid pressure regulating valve so as to make the wheel cylinder pressure in the left rear wheel approach the left rear wheel target pressure. In the case where the right front wheel target pressure is zero when the fluid pressure regulating valve is to be opened so as to make the wheel cylinder pressure in the left rear wheel approach the left rear wheel target pressure, the brake turns off the first motor.

8 Claims, 13 Drawing Sheets

BRAKING CONTROL APPARATUS

TECHNICAL FIELD

The present invention relates to a braking control apparatus.

BACKGROUND TECHNOLOGY

A braking apparatus in which pressure source pumps for a plurality of braking systems are driven by a common motor has been conventionally known. Herein, in such a braking apparatus, in order to avoid a change in deceleration by an occurrence of pressure fluctuation in the braking system on the lower pressure side, occurring due to fluid pressure interference, the following technique is proposed in which: in the braking system other than that with a maximum pressure increasing pump operation amount, the opening degree of a pressure decreasing valve is increased so as to discharge operating fluid from its system at an amount corresponding to the difference between the flow rate at the maximum pressure increasing pump operation amount and the flow rate at an operation amount of the pressure increasing pump in its system (for example, see Patent Document 1). Also, in order to suppress the fluctuation in the rear wheel brake fluid pressure, occurring when the pressures in two brake fluid pressure systems are increased with a single pump motor, the following technique is proposed in which: when the rear wheel cylinder pressure is in a steady state after reaching a target pressure, the pressure reducing valve in the rear wheel system is narrowed; and subsequently, when the front wheel cylinder pressure is in a steady state, the pump in the rear wheel system is driven (for example, see Patent Document 2). Further, a technique is proposed in which: a first pump for driving a first hydraulic circuit, and a second pump for driving a second hydraulic circuit in which braking force can be obtained by making the brake fluid pressure generated by a master cylinder operate in a wheel cylinder, are driven by a common driving source (for example, see Patent Document 3).

PATENT DOCUMENTS

[Patent Document 1] Japanese Patent Application Publication No. 2004-175283
[Patent Document 2] Japanese Patent Application Publication No. 2004-34729
[Patent Document 3] Japanese Patent Application Publication No. 2005-231396

DISCLOSURE OF THE INVENTION

Problems to be Solved by the Invention

In order to suppress mutual control interference occurring when two fluid pressure systems are driven by the rotation of a common driving source as stated above, a technique can be considered in which a cut-off valve is provided between a pump and a wheel cylinder. However, with an increasing demand for low costs of vehicles in recent years, it is also demanded that the cost for such a cut-off valve should be suppressed. Also, when an influence on another system is to be suppressed by adjusting the opening degree of a pressure reducing valve as in the technique described in the aforementioned Patent Document 1, a measure is needed in which the orifice diameter of the pressure reducing valve is increased to rapidly reduce pressure, dealing with various states. However, if the orifice diameter thereof is increased as stated above, the spring for biasing a plunger also needs to be made large in accordance with the increase in the orifice diameter. Thereby, the coil, etc., for driving the plunger also needs to be made large and accordingly a larger amount of electrical power is also consumed. Therefore, because the whole pressure reducing valve becomes large, it becomes difficult to achieve miniaturization of the fluid pressure system and reduction in the cost and power consumption thereof.

The present invention has been made in view of these situations, and a purpose of the invention is, in a braking control apparatus in which operating fluid is supplied to a plurality of wheel cylinders by using multiple pumps each driven by a common driving source, to simply suppress an influence on the system on one side, occurring due to the fluid pressure control in the other system, while an increase in the size of the apparatus is being suppressed.

Means for Solving the Problem

In order to solve the aforementioned problems, a braking control apparatus according to an embodiment of the present invention comprises: first and second pumps each driven by a common driving source; a first fluid channel connecting a first wheel cylinder for generating braking force in a first wheel and the first pump; a second fluid channel connecting a second wheel cylinder for generating braking force in a second wheel and the second pump; a first control valve provided in a third fluid channel connecting a reservoir for retaining operating fluid and the first fluid channel; a second control valve provided in a fourth fluid channel connecting the reservoir and the second fluid channel; a target pressure determination means configured to determine each of a first target pressure, which is the target fluid pressure of the first wheel cylinder, and a second target pressure, which is the target fluid pressure of the second wheel cylinder; and a wheel cylinder pressure control means configured to supply the operating fluid to each of the first fluid channel and the second fluid channel by operating the driving source, and configured to control the opening/closing of the first control valve so as to make the first wheel cylinder pressure, which is the fluid pressure in the first wheel cylinder, approach the first target pressure, and configured to control the opening/closing of the second control valve so as to make the second wheel cylinder pressure, which is the fluid pressure in the second wheel cylinder, approach the second target pressure. In the case where the first target pressure is smaller than or equal to a predetermined first reference pressure when the second control valve is to be opened so as to make the second wheel cylinder pressure approach the second target pressure, the wheel cylinder pressure control means reduces the driving force or rotational speed of the driving source.

According to the embodiment, the second wheel cylinder pressure can be suitably controlled, while an influence on the first wheel cylinder pressure is being suppressed. Accordingly, it becomes possible to easily achieve miniaturization of a pressure reducing valve or a reduction in the cost thereof, in comparison with, for example, the case where the orifice diameter of the pressure reducing valve is increased.

In the case where the first wheel cylinder pressure is to be held when the second pump is being driven by the driving source, the wheel cylinder pressure control means may hold the first wheel cylinder pressure by adjusting the opening degree of the first control valve; and in the case where the second wheel cylinder pressure is to be held when the second pump is being driven by the driving source, the wheel cylinder pressure control means may hold the second wheel cylinder pressure by adjusting the opening degree of the second control valve.

According to the embodiment, the apparatus can be simplified and accordingly the cost thereof can be reduced in comparison with, for example, the case where the second wheel pressure is held by providing a cut-off valve, etc., between a pump and a wheel cylinder.

In the case where the first target pressure is smaller than or equal to the first reference pressure and the absolute value of the target pressure reduction gradient of the second wheel cylinder pressure is greater than or equal to a predetermined value when the second valve is to be opened so as to make the second wheel cylinder pressure approach the second target pressure, the wheel cylinder pressure control means may reduce the driving force or rotational speed of the driving source.

According to the embodiment, a decrease in the driving force of the driving source can be avoided when the absolute value of the target pressure reduction gradient of the second wheel cylinder pressure is greater than or equal to a predetermined value. Accordingly, the frequency at which the driving force or rotational speed of the driving source is reduced can be reduced.

The braking control apparatus may further comprise a regenerative braking unit configured to generate regenerative braking force in at least the second wheel by regenerative control of an electrical motor. When the regenerative control is to be executed, the target pressure determination means may set the second target pressure based on the execution of the regenerative control; and in the case where the first target pressure is smaller than or equal to the first reference pressure when the second control valve is to be opened so as to make the second wheel cylinder pressure approach the second target pressure preset based on the execution of the regenerative control, the wheel cylinder pressure control means may reduce the driving force or rotational speed of the driving source.

According to the embodiment, an influence on the system on one side, occurring due to the fluid pressure control in the other system, can be simply suppressed using the regenerative control. Further, the energy consumed by the driving source can be reduced by reducing the driving force or rotational speed thereof.

The wheel cylinder pressure control means may reduce the driving force or rotational speed of the driving source by reducing the duty ratio of the current pulse-supplied to the driving source. According to the embodiment, the driving force of the drive source can be simply reduced. Also, the electrical power consumed by the driving source can be suppressed.

The braking control apparatus may further comprise a third control valve provided between the first control valve and the reservoir in the third fluid channel. When it is determined that a predetermined abnormal condition has been satisfied, the wheel cylinder pressure control means may close the third control valve; and when it is determined that the abnormal condition is not satisfied, and in the case where the first target pressure is smaller than or equal to the first reference pressure when the second control valve is to be opened so as to make the second wheel cylinder pressure approach the second target pressure, the wheel cylinder pressure control means may open the first and the third control valves even when the first wheel cylinder pressure is smaller than or equal to the first reference pressure.

According to the embodiment, the operating fluid can be discharged from the first wheel cylinder to the reservoir by opening the first and the third control valves. Accordingly, an increase in the first wheel cylinder pressure can be suppressed by opening the second control valve.

The braking control apparatus may further comprise a fluid pressure sensor configured to detect the first wheel cylinder pressure. When the first target pressure is zero and a predetermined correction execution condition is satisfied, the wheel cylinder pressure control means may execute zero-point correction for the fluid pressure sensor; and when the driving source is being operated so as to increase the second wheel cylinder pressure toward the second target pressure, the wheel cylinder pressure control means may avoid the execution of the zero-point correction for the fluid pressure sensor, assuming that the correction execution condition is not satisfied even when the first target pressure is zero.

While the driving source is being operated, a pressure loss, i.e., residual pressure, may arise in the second wheel cylinder pressure. According to the embodiment, the execution of the zero-point correction and the execution of determining whether the zero-point of the fluid pressure sensor is abnormal can be avoided, and a decrease in detection accuracy, occurring due to the fluid pressure sensor, can be suppressed.

The barking control apparatus may further comprise: a first pressure increasing valve provided between the connection point of the first fluid channel and the third fluid channel, and the first pump; and a second pressure increasing valve provided between the connection point of the second fluid channel and the fourth fluid channel, and the second pump. The wheel cylinder pressure control means may: control the opening/closing of the first control valve and the first pressure increasing valve so as to make the first wheel cylinder pressure approach the first target pressure; control the opening/closing of the second control valve and the second pressure increasing valve so as to make the second wheel cylinder pressure approach the second target pressure; and, in the case where the first target pressure is smaller than or equal to the first reference pressure when the second pressure increasing valve is to be closed and the second control valve is to be opened so as to make the second wheel cylinder pressure approach the second target pressure, reduce the driving force or rotational speed of the driving source.

According to the embodiment, even in a braking control apparatus in which first and second pressure increasing valves are provided as stated above, an influence on the system on one side, occurring due to the fluid pressure control in the other system, can be suppressed, while an increase in the size of the apparatus is being suppressed.

Advantage of the Invention

According to the present invention, in a braking control apparatus in which operating fluid is supplied to a plurality of wheel cylinders by using multiple pumps each driven by a common driving source, an influence on the system on one side, occurring due to the fluid pressure control in the other system, can be simply suppressed, while an increase in the size of the apparatus is being suppressed.

BRIEF DESCRIPTION OF THE DRAWINGS

FIG. 12($b$) is a graph illustrating the system wheel pressure Pr at the time;

FIG. 15($b$) is a graph illustrating the system wheel pressure at the time;

FIG. 15($c$) is a graph illustrating the rotation frequency of a motor commonly used in each of the control for the wheel pressure to be controlled and for the system wheel pressure;

BEST MODE FOR CARRYING OUT THE INVENTION (First Embodiment)

Figure 1:
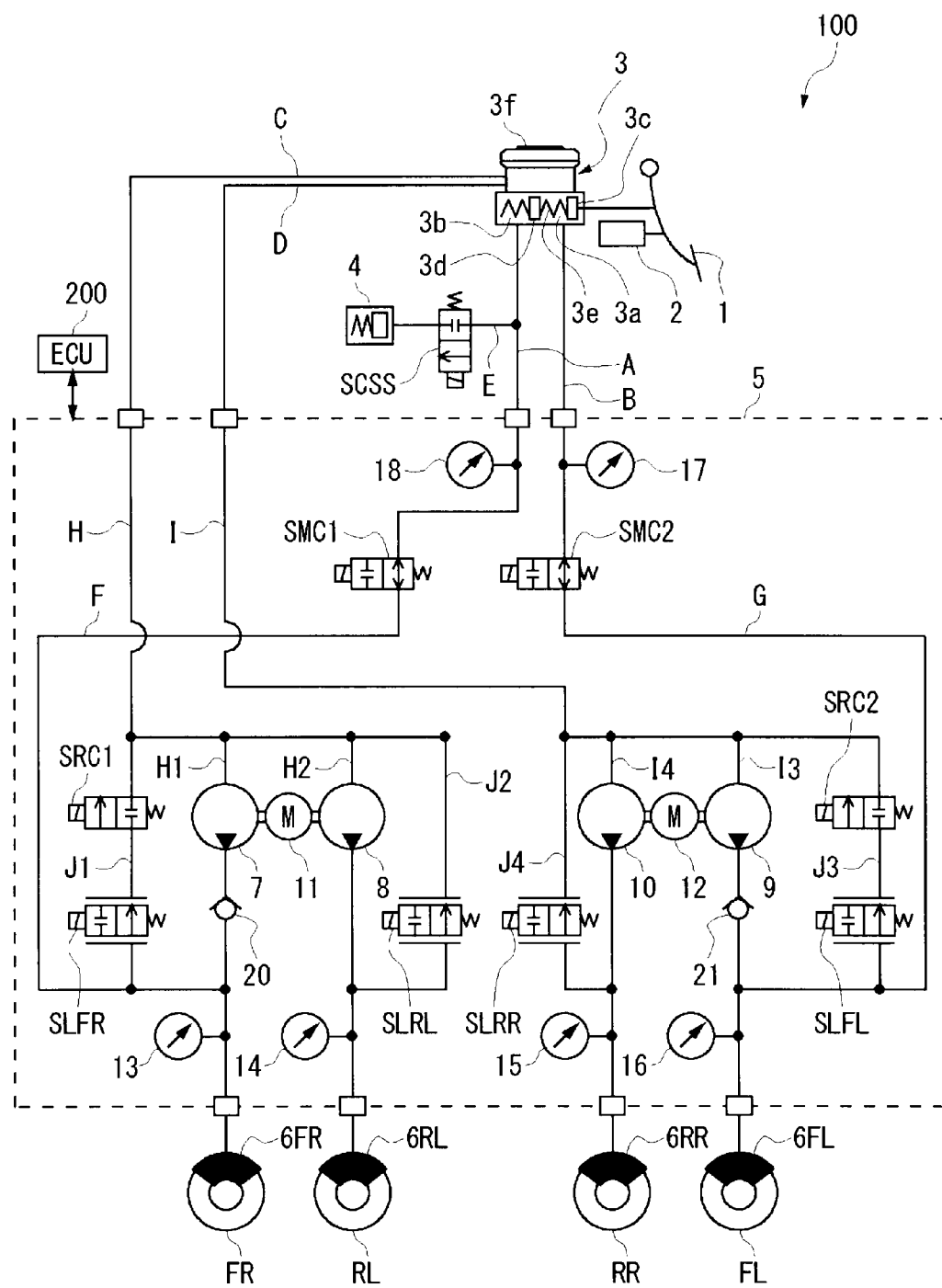
FIG. 1 is a view schematically illustrating the structure of a braking control apparatus according to a first embodiment.

FIG. 1 is a view schematically illustrating the structure of a braking control apparatus 100 according to a first embodiment. Hereinafter, the configuration of the braking control apparatus 100 according to the first embodiment will be described with reference to FIG. 1. Herein, a case will be described where the braking control apparatus 100 according to the first embodiment is applied to a vehicle in which an X-shaped fluid pressure circuit including each of the right front wheel-left rear wheel piping system and the left front wheel-right rear wheel piping system is configured.

The braking control apparatus 100 comprises a brake pedal 1, a stroke sensor 2, a master cylinder 3, a stroke control valve SCSS, a stroke simulator 4, a brake fluid pressure control actuator 5, and wheel cylinders 6FL, 6FR, 6RL, and 6RR. The braking control apparatus 100 also comprises a brake ECU200 as a controller for controlling the operation of each part of the braking control apparatus 100.

When a driver depresses the brake pedal 1, a pedal stroke is inputted into the stroke sensor 2 as an operation amount of the brake pedal 1, so that a detection signal corresponding to the pedal stroke is outputted from the stroke sensor 2. The detection signal is inputted into the brake ECU200 and the pedal stroke of the brake pedal 1 is detected by the brake ECU200. Herein, the stroke sensor 2 is taken as an example of an operation amount sensor for detecting an operation amount of a brake operation member; however, the stroke sensor 2 may be replaced with a tread force sensor, etc., for detecting the tread force applied to the brake pedal 1.

The brake pedal 1 is connected with a push rod, etc., for communicating the pedal stroke to the master cylinder 3. It is made that the master cylinder pressure is generated in a primary chamber 3$a$ and a secondary chamber 3$b$, which are provided in the master cylinder 3, by the push rod, etc., being pushed.

The master cylinder 3 is provided with a primary piston 3$c$ and a secondary piston 3$d$ that form the primary chamber 3$a$ and the secondary chamber 3$b$. The primary piston 3$c$ and the secondary piston 3$d$ are configured to return the brake pedal 1 to the original position with each of the pistons 3$c$ and 3$d$ pressed by receiving the elastic force of a spring 3$e$ while the brake pedal 1 is not being depressed.

The primary chamber 3$a$ and the secondary chamber 3$b$ in the master cylinder 3 are respectively connected with a pipeline B and a pipeline A, each of which extends toward the brake fluid pressure control actuator 5.

The master cylinder 3 is also provided with a reservoir tank 3$f$. The reservoir tank 3$f$ is connected with each of the primary chamber 3$a$ and the secondary chamber 3$b$ through a not-illustrated channel when the brake pedal 1 is at the original position in order to supply brake fluid into the master cylinder 3 as the operating fluid and to retain the excessive operating fluid in the master cylinder 3. The reservoir tank 3$f$ is connected with a pipeline C and a pipeline D, each of which extends toward the brake fluid pressure control actuator 5.

The stroke simulator 4 is connected with a pipeline E leading to the pipeline A and plays a role of housing the operating fluid in the secondary chamber 3$b$. The pipeline E is provided with the stroke control valve SCSS composed of a normally-closed two-position valve capable of controlling a communication/cut-off state of the pipeline E, and it is configured that the flow of the operating fluid into the stroke simulator 4 can be controlled by the stroke control valve SCSS. Alternatively, the stroke control valve SCSS may be deleted and the stroke simulator 4 may be connected with the pipeline B.

The brake fluid pressure control actuator 5 is provided with a pipeline F connected with the pipeline A so as to connect the secondary chamber 3 in the master cylinder 3 and the wheel cylinder 6FR corresponding to the right front wheel FR. The pipeline F is provided with a cut-off valve SMC1. The cut-off valve SMC1 is a twp-position valve that is in an open state (communication state) when not powered and in a closed state (cut-off state) when powered. A communication/cut-off state of the pipeline F is controlled by the cut-off valve SMC1, and thereby the supply of the operating fluid into the wheel cylinder 6FR through the pipelines A and F is controlled.

The brake fluid pressure control actuator 5 is provided with a pipeline G connected with the pipeline B so as to connect the primary chamber 3a in the master cylinder 3 and the wheel cylinder 6FL corresponding to the left front wheel FL. The pipeline G is provided with a cut-off valve SMC2. The cut-off valve SMC2 is a two-position valve that is in an open state when not powered and in a closed state when powered. A communication/cut-off state of the pipeline G is controlled by the cut-off valve SMC2, and thereby the supply of the operating fluid into the wheel cylinder 6FL through the pipelines B and G is controlled.

Also, the brake fluid pressure control actuator 5 is provided with both a pipeline H connected with the pipeline C that extends from the reservoir tank 3f and a pipeline I connected with the pipeline D. The pipeline H branches into two pipelines H1 and H2, which are respectively connected with the wheel cylinders 6FR and 6RL. The pipeline I branches into two pipelines I3 and I4, which are respectively connected with the wheel cylinders 6FR and 6RR. The wheel cylinders 6RL and 6RR correspond to the left rear wheel RL and the right rear wheel RR, respectively.

Each of the pipelines H1, H2, I3, and I4 is provided with each of pumps 7, 8, 9, and 10 in this order. Each of the pumps 7 to 10 is composed of, for example, a trochoid pump excellent in quietness. Of the pumps 7 to 10, the pumps 7 and 8 are driven by a first motor 11, and the pumps 9 and 10 are driven by a second motor 12. In the first embodiment, a fluid pressure source is composed of the pumps 7, 8, 9, and 10, the first motor 11, and the second motor 12.

Also, each of the pumps 7 to 10 is provided in parallel with each of pipelines J1, J2, J3, and J4 in this order. The pipeline J1 connected in parallel with the pump 7 is provided with a communication valve SRC1 and a fluid pressure regulating valve SLFR, which are connected in series. The communication valve SRC1 and the fluid pressure regulating valve SLFR are respectively arranged such that the communication valve SRC1 is located on the suction port side of the pump 7 (on the downstream side of the operating fluid flow direction in the pipeline J1) and the fluid pressure regulating valve SLFR is located on the discharge port side thereof (on the upstream side of the operating fluid flow direction in the pipeline J1). That is, it is configured that communication/cut-off between the reservoir tank 3f and the fluid pressure regulating valve SLFR can be controlled by the communication valve SRC1. The communication valve SRC1 is a two-position valve that is in a closed state when not powered and in an open state when powered, and the fluid pressure regulating valve SLFR is a linear valve that is in an open state when not powered and in a closed state when powered, the opening degree of which is adjusted by power supply control. Alternatively, the communication valve SRC1 may be replaced with a linear valve, or with a two-position valve capable of executing duty-control by reducing current after powered.

The pipeline J2 connected in parallel with the pump 8 is provided with a fluid pressure regulating valve SLRL. The fluid pressure regulating valve SLRL is a linear valve in the same way as the fluid pressure regulating valve SLFR.

The pipeline J3 connected in parallel with the pump 9 is provided with a communication valve SRC2 and a fluid pressure regulating valve SLFL, which are connected in series. The communication valve SRC2 and the fluid pressure regulating valve SLFL are respectively arranged such that the communication valve SRC2 is located on the suction port side of the pump 9 (on the downstream side of the operating fluid flow direction in the pipeline J3) and the fluid pressure regulating valve SLFL is located on the discharge port side thereof (on the upstream side of the operating fluid flow direction in the pipeline J3). That is, it is configured that communication/cut-off between the reservoir tank 3f and the fluid pressure regulating valve SLFL can be controlled by the communication valve SRC2. The communication valve SRC2 is a two-position valve that is in a closed state when not powered and in an open state when powered, and the fluid pressure regulating valve SLFL is a linear valve that is in an open state when not powered and in a closed state when powered, the opening degree of which is adjusted by power supply control. Alternatively, the communication valve SRC2 may be replaced with a linear valve, or with a two-position valve capable of executing duty-control by reducing current after powered.

The pipeline J4 connected in parallel with the pump 10 is provided with a fluid pressure regulating valve SLRR. The fluid pressure regulating valve SLRR is a linear valve in the same way as the fluid pressure regulating valve SLFL.

Each of fluid pressure sensors 13, 14, 15, and 16 is arranged between each of the pumps 7 to 10 and each of the wheel cylinders 6FR, 6FL, 6RR, and 6RL in the pipelines J1 to J4, each of the fluid pressure sensors 13 to 16 being configured to detect the fluid pressure in each of the wheel cylinders 6FR, 6FL, 6RR, and 6RL. Also, fluid pressure sensors 17 and 18 are arranged on the upstream side (on the side near to the master cylinder 3) from the cut-off valves SMC1 and SMC2 in the pipelines F and G, so that the master cylinder pressure generated in the primary chamber 3a and the secondary chamber 3b in the master cylinder 3 can be detected.

Further, the discharge port of the pump 7 for applying pressure to the wheel cylinder 6FR, and that of the pump 9 for applying pressure to the wheel cylinder 6FL, are provided with check valves 20 and 21, respectively. The check valves 20 and 21 are provided to restrict the flow of the operating fluid from the sides of the wheel cylinders 6FR and 6FL to the sides of the pumps 7 and 9, respectively. The fluid pressure actuator 5 is configured with such a structure.

In the braking control apparatus 100 having the aforementioned configuration, a first piping system is composed of: a fluid pressure circuit including both circuits connecting the reservoir tank 3f and the wheel cylinders 6FR and 6RL through the pipelines C, H, H1, and H2, and circuits of the pipelines J1 and J2 that are connected in parallel with the pumps 7 and 8; and a fluid pressure circuit (the other fluid pressure circuit) connecting the secondary chamber 3b and the wheel cylinder 6FR through the pipelines A and F.

A second piping system is composed of: a fluid pressure circuit including both circuits connecting the reservoir tank 3f and the wheel cylinders 6FL and 6RR through the pipelines D, I, I3, and I4, and circuits of the pipelines J3 and J4 that are connected in parallel with the pumps 9 and 10; and a fluid pressure circuit (the other fluid pressure circuit) connecting the primary chamber 3a and the wheel cylinder 6FL through the pipelines B and G.

The detection signals from the stroke sensor 2 and each of the fluid pressure sensors 13 to 18 are inputted into the brake ECU200, and it is configured that, based on the pedal stroke, the fluid pressure in each of the wheel cylinders, and the master cylinder pressure, which are determined from each of these detection signals, control signals for driving the stroke control valve SCSS, the cut-off valves SMC1 and SMC2, the communication valves SRC1 and SRC2, the fluid pressure regulating valves SLFR, SLFL, SLRR, and SLRL, the first motor 11, and the second motor 12, are outputted from the brake ECU200.

In the braking control apparatus 100 according to the first embodiment, the wheel cylinders 6FR and 6FL, and the wheel cylinders 6FL and 6RR, are respectively connected by the pipelines C and H, or the pipelines D and I, which are different from each other. Accordingly, it becomes possible that a larger amount of the operating fluid is supplied to each of the wheel cylinders 6FR, 6RL, 6FL, and 6RR, in comparison with the case where the wheel cylinders 6FR, 6RL, 6FL, and 6RR, and the reservoir tank 3f are connected by a single pipeline. Further, even if the pipeline on one side breaks down, the operating fluid can be supplied to the wheel cylinders connected with the pipeline on the other side through the pipeline on the other side, and hence a situation can be avoided in which pressure cannot be applied to all of the wheel cylinders. As a result, the reliability of the braking control apparatus 100 is improved.

Subsequently, operations of the braking control apparatus 100 according to the first embodiment will be described separately during normal braking operation and when an abnormal situation occurs in the braking control apparatus 100 (hereinafter, referred to as an abnormal state). It is determined by the brake ECU200 based on the conventionally executed initial check, etc., whether an abnormal situation occurs.

(Braking Operation During Normal Time)

During normal time, when the brake pedal 1 is depressed and the detection signal of the stroke sensor 2 is inputted into the brake ECU200, the brake ECU200 creates the following state by controlling the various valves SCSS, SMC1, SMC2, SRC1, SRC2, SLFR, SLFL, SLRR, and SLRL, the first motor 11, and the second motor 12: that is, the cut-off valves SMC1 and SMC2 are both powered on, and the communication valves SRC1 and SRC2 are also both powered on. Thereby, the cut-off valves SMC1 and SMC2 are made to be in cut-off states and the communication valves SRC1 and SRC2 are made to be in communication states.

The opening degree of each of the fluid pressure regulating valves SLFR, SLFL, SLRR, and SLRL is adjusted by controlling an amount of power. The stroke control valve SCSS is powered on. And accordingly, the stroke simulator 4 is in a communication state with the secondary chamber 3b through the pipelines A and E, and even if each of the pistons 3c and 3d is transferred when the brake pedal 1 is depressed, the operating fluid in the secondary chamber 3b is transferred into the stroke simulator 4. Accordingly, it is made that the brake pedal 1 can be depressed without making the driver feel that depressing the brake pedal 1 is like depressing a hardboard (board feeling) with the master cylinder pressure being high.

Further, the first motor 11 and the second motor 12 are both powered on, and suction and discharge of the operating fluid are executed by the pumps 7 to 10. When the pumps 7 to 10 have been operated, the operating fluid is supplied to each of the wheel cylinders 6FR, 6FL, 6RR, and 6RL. Because the cut-off valves SMC1 and SMC2 are made to be in cut-off states at the time, the fluid pressure on the downstream side of the pumps 7 to 10, i.e., the fluid pressure in each of the wheel cylinders 6FR, 6FL, 6RR, and 6RL is increased. And because the communication valves SRC1 and SRC2 are in communication states and the opening degree of each of the fluid pressure regulating valves SLFR, SLFL, SLRR, and SLRL is controlled, the fluid pressure in each of the wheel cylinders 6FR, 6FL, 6RR, and 6RL is adjusted in accordance with its opening degree.

The brake ECU200 monitors the fluid pressure supplied to each of the wheel cylinders 6FR, 6FL, 6RR, and 6RL based on the detection signal of each of the fluid pressure sensors 13 to 16, so that an amount of power to each of the first motor 11 and the second motor 12 is adjusted, thereby controlling the rotation frequency of each of the first motor 11 and the second motor 12. Along with that, the brake ECU200 also controls an amount of power to each of the fluid pressure regulating valves SLFR, SLFL, SLRR, and SLRL, and thereby it is made that the fluid pressure in each of the wheel cylinders 6FR, 6FL, 6RR, and 6RL becomes a desired value.

Thereby, it is made that the braking force in accordance with the pedal stroke of the brake pedal 1 is generated.

(Braking Operation in Abnormal State)

In an abnormal state, there is the possibility that a control signal cannot be outputted from the brake ECU200, or the various valves SCSS, SMC1, SMC2, SRC1, SRC2, SLFR, SLFL, SLRR, or SLRL, the first motor 11, or the second motor 12 may not be driven normally. Accordingly, when it is determined that a predetermined abnormal condition has been satisfied, all of the various valves SCSS, SMC1, SMC2, SRC1, SRC2, SLFR, SLFL, SLRR, and SLRL, the first motor 11, and the second motor 12 are powered off.

That is, because the cut-off valves SMC1 and SMC2 are powered off, the cur-off valves SMC1 and SMC2 are in communication states. Because the communication valves SRC1 and SRC2 are also powered off, they are in cut-off states. Further, because the fluid pressure regulating valves SLFR, SLFL, SLRR, and SLRL are also powered off, they are in communication states. Furthermore, because the stroke control valve SCSS is also powered off, a cut-off state arises between the stroke simulator 4 and the secondary chamber 3b. Further, because the first motor 11 and the second motor 12 are both powered off, the suction and discharge of the operating fluid by the pumps 7 to 10 are also stopped.

In such a state, the primary chamber 3a in the master cylinder 3 is in a state of being communicated with the wheel cylinder 6FL through the pipelines B, G, and I3, and the secondary chamber 3b is in a state of being communicated with the wheel cylinder 6FR through the pipelines A, F and H1. Accordingly, when the brake pedal 1 is depressed and the push rod, etc., is pushed in accordance with the pedal stroke, the master cylinder pressure is generated in the primary chamber 3a and the secondary chamber 3b in the master cylinder 3, the master cylinder pressure being transmitted to the wheel cylinders 6FR and 6FL. Thereby, it is made to generate the braking force in the right front wheel FR and the left front wheel FL.

Herein, in the braking control apparatus 100, the communication valve SRC1 is arranged between the pipelines F and H and the communication valve SRC2 is arranged between the pipelines G and I. Accordingly, it is made in an abnormal state that a cut-off state arises between the master cylinder 3 and the reservoir tank 3f by the communication valves SRC1 and SRC2. Thereby, it can be prevented that, when the brake pedal 1 is depressed, the operating fluid in the master cylinder 3 may flow near to the reservoir tank 3f through the pipeline H or I such that pressure cannot be applied to the wheel cylinders 6FR and 6FL.

In the operation in such an abnormal state, it is made that the fluid pressure in the wheel cylinders 6FR and 6FL is generated in the pipelines H1 and I3. However, because the check valves 20 and 21 are provided in the pipelines H1 and I3, it can be prevented that the fluid pressure in the wheel cylinders 6FR and 6FL may be applied to the pumps 7 and 9 to cause a leak of the operating fluid, thereby lowering the fluid pressure.

As stated above, in the braking control apparatus 100 according to the first embodiment, a relationship is created in which the input of the pedal stroke in the brake pedal 1 is not separated from the supply of the operating fluid from the master cylinder 3. Accordingly, even if any abnormal state occurs in the braking control apparatus 100, it is possible that the braking control apparatus 100 surely generates braking force in wheels without depending on the control by the brake ECU200.

As stated above, each of the pumps 7 and 8 is driven by the common first motor 11. The pipeline H1 connects the wheel cylinder 6FR for generating driving force in the right front wheel and the pump 7. The fluid pressure regulating valve SLFR is provided in the pipeline J1 connecting the reservoir tank 3f and the pipeline H1. The communicating valve SRC1 is provided between the fluid pressure regulating valve SLFR and the reservoir tank 3f in the pipeline J1. The pipeline H2 connects the wheel cylinder 6RL for generating braking force in the left rear wheel and the pump 8. The fluid pressure regulating valve SLRL is provided in the pipeline J2 connecting the reservoir tank 3f and the pipeline H2. Accordingly, even while the first motor 11 is being operated, it becomes possible that the fluid pressure in the wheel cylinder 6FR and that in the wheel cylinder 6RL are independently adjusted by controlling each of the opening degrees of the fluid pressure regulating valves SLFR and SLRL.

Each of the pumps 9 and 10 is driven by the common second motor 12. The pipeline I3 connects the wheel cylinder 6FL for generating braking force in the left front wheel and the pump 9. The fluid pressure regulating valve SLFL is provided in the pipeline J3 connecting the reservoir tank 3f and the pipeline I3. The communication valve SRC2 is provided between the fluid pressure regulating valve SLFL and the reservoir tank 3f in the pipeline J3. The pipeline I4 connects the wheel cylinder 6RR for generating braking force in the right rear wheel and the pump 10. The fluid pressure regulating valve SLRR is provided in the pipeline J4 connecting the reservoir tank 3f and the pipeline I4. Accordingly, even while the second motor 12 is being operated, it becomes possible that the fluid pressure in the wheel cylinder 6FL and that in the wheel cylinder 6RR are independently adjusted by controlling each of the opening degrees of the fluid pressure regulating valves SLFL and SLRR.

Specifically, the brake ECU200 determines each of the right front wheel target pressure, which is the target fluid pressure of the wheel cylinder 6FR, and the left rear wheel target pressure, which is the target fluid pressure of the wheel cylinder 6RL. The brake ECU200 also determines each of the left front wheel target pressure, which is the target fluid pressure of the wheel cylinder 6FL, and the right rear wheel target pressure, which is the target fluid pressure of the wheel cylinder 6RR. Accordingly, the brake ECU200 functions as a target pressure determination means configured to determine the target pressure of the wheel cylinder in each wheel.

In order to make each of the wheel cylinder pressure approach the determined target pressure, the brake ECU200 first operates the first motor 11 to drive the pump 7 such that the operating fluid is supplied to the pipeline H1, and to drive the pump 8 such that the operating fluid is supplied to the pipeline H2. The brake ECU200 also operates the second motor 12 to drive the pump 9 such that the operating fluid is supplied to the pipeline I3, and to drive the pump 10 such that the operating fluid is supplied to the pipeline I4.

The brake ECU200 controls the opening/closing of the fluid pressure regulating valve SLFR so as to make the fluid pressure in the wheel cylinder 6FR approach the right front wheel target pressure, and controls the opening/closing of the fluid pressure regulating valve SLRL so as to make the fluid pressure in the wheel cylinder 6RL approach the left rear wheel target pressure. The brake ECU200 also controls the opening/closing of the fluid pressure regulating valve SLFL so as to make the fluid pressure in the wheel cylinder 6FL approach the left front wheel target pressure, and controls the opening/closing of the fluid pressure regulating valve SLRR so as to make the fluid pressure in the wheel cylinder 6RR approach the right rear wheel target pressure. Accordingly, the brake ECU200 functions as a wheel cylinder pressure control means configured to control each of the wheel cylinder pressures in the wheel cylinders 6FL, 6FR, 6RL, and 6RR.

While the first motor 11 is being operated, the brake ECU200 controls the fluid pressure in the wheel cylinder 6FR, i.e., increases, reduces, or holds the fluid pressure thereof by adjusting the opening degree of the fluid pressure regulating valve SLFR, and adjusts the fluid pressure in the wheel cylinder 6Rl by adjusting the opening degree of the fluid pressure regulating valve SLRL. Further, while the second motor 12 is being operated, the brake ECU200 adjusts the fluid pressure in the wheel cylinder 6FL by adjusting the opening degree of the fluid pressure regulating valve SLFL, and adjusts the fluid pressure in the wheel cylinder 6RR by adjusting the opening degree of the fluid pressure regulating valve SLRR.

When the operating fluid is supplied to two wheel cylinders by driving two pumps with a common motor as stated above, when the pressure in the wheel cylinder on one side is reduced, the pressure reduction gradient and the response may be deteriorated by an influence occurring due to the discharge of the operating fluid for increasing the fluid pressure in the wheel cylinder on the other side. If the fluid pressure in the wheel cylinder on the other side is increased to cause excessive braking force in the wheel on the other side with this, operability of the vehicle by the driver may be affected. If the orifice system of a fluid pressure regulating valve is increased in order to control and reduce such an increase, a spring or a coil, etc., within the fluid pressure regulating valve need to be made large, thereby making miniaturization of the fluid pressure regulating valve difficult.

Accordingly, in the case where the right front wheel target pressure is smaller than or equal to a predetermined first reference pressure when the fluid pressure regulating valve SLRL is to be opened so as to make the fluid pressure in the wheel cylinder 6RL approach the left rear wheel target pressure, the brake ECU200 reduces the driving force or rotational speed of the first motor 11, which is a common driving source. In addition, in the case where the left front wheel target pressure is smaller than or equal to a predetermined first reference pressure when the fluid pressure regulating valve SLRR is to be opened so as to make the fluid pressure in the wheel cylinder 6RR approach the right rear wheel target pressure, the brake ECU200 reduces the driving force or rotational speed of the second motor 12, which is a common driving source. Hereinafter, these operations will be described in detail with reference to the accompanying flowcharts.

Figure 2:
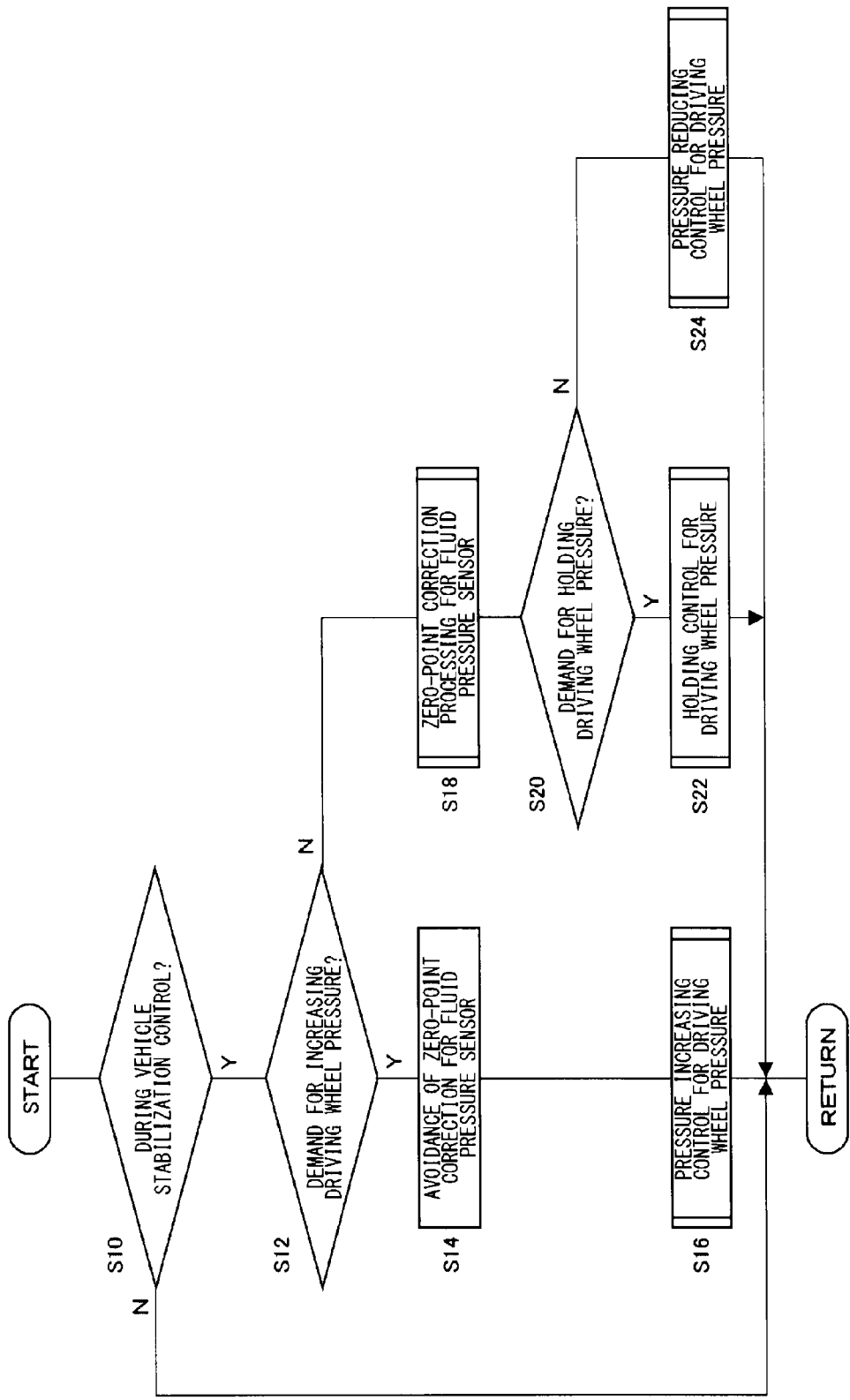
FIG. 2 is a flowchart illustrating the procedure of the braking control for a driving wheel by the braking control apparatus according to the first embodiment.

FIG. 2 is a flowchart illustrating the procedure of the braking control for a driving wheel by the braking control apparatus 100 according to the first embodiment. The processing illustrated in FIG. 2 is initiated when the ignition switch of a vehicle is turned on and thereafter is executed repeatedly at every predetermined period. Because a vehicle in which the braking control apparatus 100 according to the first embodiment is provided is a rear-wheel-drive vehicle, the left rear wheel RL and the right rear wheel RR are driving wheels.

Hereinafter, the first motor 11 or the second motor 12 is appropriately referred to as a "motor". The fluid pressure sensor 13, 14, 15, or 16 is appropriately referred to as a "fluid pressure sensor". The fluid pressure regulating valve SLFR, SLRL, SLFL, or SLRR is appropriately referred to as a "fluid pressure regulating valve".

The brake ECU200 determines whether vehicle stabilization control is being executed (S10). In the first embodiment, the vehicle stabilization control means so-called traction control. The traction control is a technique for enhancing the running stability of a vehicle by grasping idle running from the vehicle speed and each wheel speed, etc., and by adjusting the driving force for the driving wheel to suppress the idle running. The traction control is executed when a vehicle is running and when there is no demand for braking. In the traction control, braking force is provided so as to suppress the driving force for the driving wheel whose idle running has been detected, as stated above; on the other hand, the target pressure of the wheel cylinder pressure in the non-driving wheel is usually set to zero MPa. Because the traction control is a publicly known technique, its detailed description will be omitted. While the vehicle stabilization control is not being executed (S10/N), the processing in this flowchart is once ended.

Herein, when a predetermined correction condition is satisfied in the braking control apparatus 100, so-called zero-point correction is executed for the fluid pressure sensors 13, 14, 15, and 16. In the zero-point correction, when all of the target pressures of the wheel cylinders 6FR, 6RL, 6FL, and 6RR are set to be zero MPa and when the wheel cylinder pressures are being controlled so as to achieve the target pressures, the detection value of each of the fluid pressure sensors 13, 14, 15, and 16 is reset to zero MPa. Thereby, deterioration in the detection accuracy of the fluid pressure sensors is suppressed. Alternatively, such zero-point correction and detection of an abnormal state in the hydraulic system may not be executed.

On the other hand, when there is a demand for increasing the wheel cylinder pressure, the brake ECU200 operates the motor for driving the pump connected with the wheel cylinder whose pressure is demanded to be increased, in order to supply the operating fluid to the wheel cylinder. Herein, when the first motor 11 or the second motor 12 is being operated because there is a demand for increasing the wheel cylinder pressure in the system wheel, even if the target pressure of, for example, a certain wheel cylinder pressure is zero MPa, a pressure loss, i.e., residual pressure arises even if the fluid pressure regulating valve is opened to make the wheel cylinder pressure be zero MPa, causing the possibility that the wheel cylinder pressure may not be completely reduced to zero MPa. If the zero-point correction is executed at the time, the detection accuracy of the fluid pressure sensor may be affected.

Accordingly, when the vehicle stabilization control is being executed (S10/Y), the brake ECU200 determines whether there is a demand for increasing the wheel cylinder pressure in the driving wheel (hereinafter, referred to as "driving wheel pressure") using detection results of the stroke sensor 2 and that of the fluid pressure sensors 17 and 18, and the like (S12). When there is a demand for increasing the driving wheel pressure (S12/Y), the brake ECU200 avoids execution of the zero-point correction for the fluid pressure sensor for detecting the wheel cylinder pressure, even if the target pressure thereof is zero MPa (S14).

For example, while operating the first motor 11 to increase the fluid pressure in the wheel cylinder 6RL toward the left rear wheel target value, the brake ECU200 avoids execution of the zero-point correction for the fluid pressure sensor 13, assuming that the correction execution condition is not satisfied even if the right front wheel target pressure is zero MPa.

Also, while operating the second motor 12 to increase the fluid pressure in the wheel cylinder 6RR toward the right rear wheel target value, the brake ECU200 avoids execution of the zero-point correction for the fluid pressure sensor 16, assuming that the correction execution condition is not satisfied even if the left front wheel target pressure is zero MPa. Thereby, an influence on the zero-point correction by the residual pressure can be suppressed.

Subsequently, the brake ECU200 executes pressure increasing control of the driving wheel pressure (S16). In the pressure increasing control, the brake ECU200 operates the motor for driving the pump that corresponds to the driving wheel and adjusts the opening degree of the fluid pressure regulating valve that corresponds to the driving wheel so as to make the driving wheel pressure approach the target pressure.

When there is no demand for increasing the driving wheel pressure (S12/N), the brake ECU200 executes the zero-point correction processing for the fluid pressure sensor (S18). The zero-point correction processing will be described later.

After the execution of the zero-point correction processing for the fluid pressure sensor, the brake ECU200 determines whether there is a demand for holding the driving wheel pressure using detection results of the stroke sensor 2 and that of the fluid pressure sensors 17 and 18, and the like (S20). When there is a demand for holding the driving wheel pressure (S20/Y), the brake ECU200 executes holding control for the driving wheel pressure (S22). The holding control for the driving wheel pressure will be described later. When there is no demand for holding the driving wheel pressure (S20/N), the brake ECU200 determines that there is a demand for reducing the driving wheel pressure and executes the pressure reducing control for the driving wheel pressure (S24). The pressure reducing control for the driving wheel pressure will also be described later.

Figure 3:
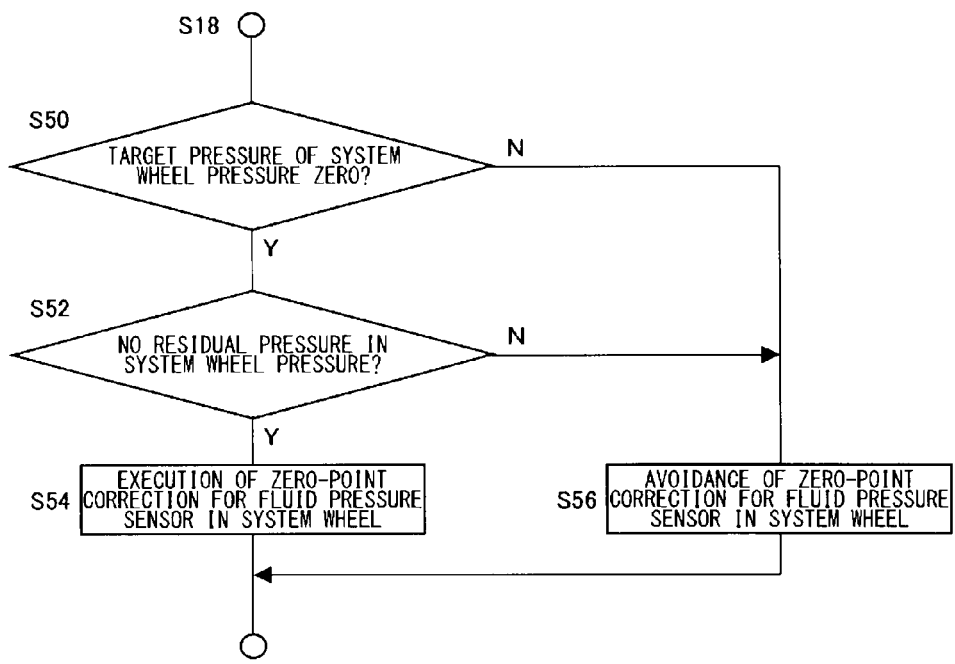
FIG. 3 is a flowchart illustrating the procedure of executing the zero-point correction processing in S18 in FIG. 2.

FIG. 3 is a flowchart illustrating the procedure of executing the zero-point correction processing in S18 in FIG. 2. The brake ECU200 determines whether the target pressure of the system wheel pressure is zero MPa or greater than zero MPa (S50). Herein, the system wheel means each of the wheels to which braking force is provided by a common motor being operated. For example, the left rear wheel RL and the right front wheel RL are the system wheels with each other, and the right rear wheel RR and the left front wheel FL are the system wheels with each other. Because the system wheel in FIG. 3 is that for the driving wheel, the brake ECU200 determines whether the right front wheel target pressure or the left front wheel target pressure is zero MPa or greater than zero MPa.

When the target pressure of the system wheel pressure is zero MPa (S50/Y), the brake ECU200 determines whether there is residual pressure in the system wheel pressure by determining whether the detection value of the fluid pressure sensor for detecting the wheel cylinder pressure in the system wheel is smaller than or equal to a predetermined reference value (S52). When there is no residual pressure in the system wheel pressure (S52/Y), the brake ECU200 executes the zero-point correction for the fluid pressure sensor in the system wheel (S54).

Specifically, when the right front wheel target pressure is zero MPa and the detection value of the fluid pressure sensor 13 is smaller than or equal to a predetermined residual pressure acceptable value, the brake ECU200 executes the zero-point correction for the fluid pressure sensor 13, assuming that the correction execution condition is satisfied. Also, when the left front wheel target pressure is zero MPa and the detection value of the fluid pressure sensor 16 is smaller than or equal to the residual pressure acceptable value, the brake ECU 200 executes the zero-point correction for the fluid pressure sensor 16, assuming that the correction execution condition is satisfied.

Because the zero-point correction cannot be executed when the target pressure of the system wheel pressure is greater than zero MPa (S50/N), the brake ECU 200 avoids the zero-point correction for the fluid pressure sensor in the system wheel (S56). In the first embodiment, because it is difficult to accurately execute the zero-point correction when there is residual pressure in the system wheel pressure (S52/N), the brake ECU 200 also avoids the zero-point correction for the fluid pressure sensor in the system wheel (S56).

Figure 4:
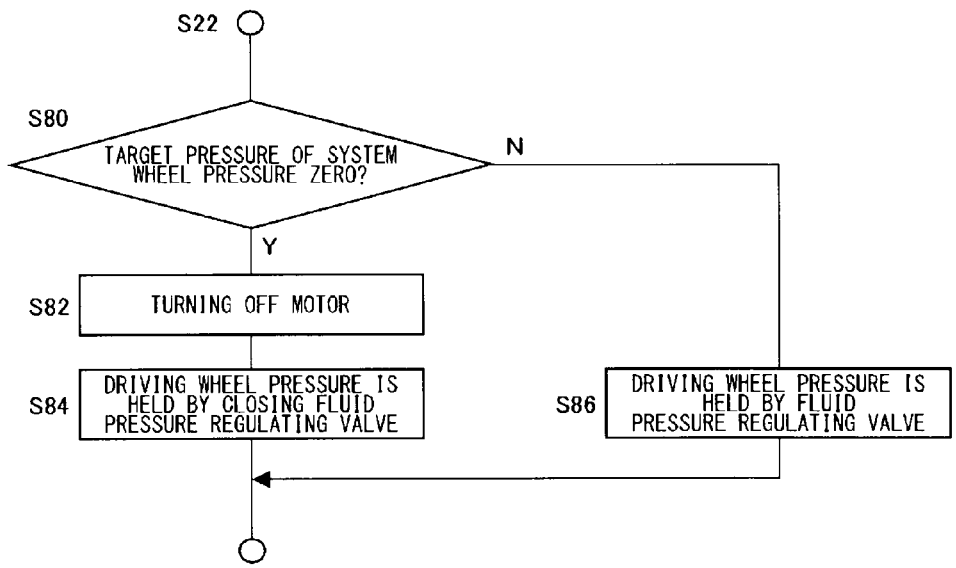
FIG. 4 is a flowchart illustrating the procedure of executing the holding control for the driving wheel pressure in S22 in FIG. 2, which is executed by the braking control apparatus according to the first embodiment.

FIG. 4 is a flowchart illustrating the procedure of executing the holding control for the driving wheel pressure in S22 in FIG. 2, which is executed by the braking control apparatus 100 according to the first embodiment. The brake ECU 200 determines whether the target pressure of the system wheel pressure is zero MPa or greater than zero MPa (S80).

When the target pressure of the system wheel pressure is greater than zero MPa (S80/N), the brake ECU 200 holds the wheel cylinder pressure by adjusting the opening degree of the fluid pressure regulating valve while turning on the motor (S86). Specifically, when the right front wheel target pressure is greater than zero MPa, the brake ECU 200 holds the fluid pressure in the wheel cylinder 6RL by adjusting the opening degree of the fluid pressure regulating valve SLRL, while turning on the first motor 11. Also, when the left front target pressure is greater than zero MPa, the brake ECU 200 holds the fluid pressure in the wheel cylinder 6RR by adjusting the opening degree of the fluid pressure regulating valve SLRR, while turning on the second motor 12.

When the target pressure of the system wheel pressure is zero MPa (S80/Y), the brake ECU 200 turns off the motor for driving the pump that corresponds to the system wheel (S82). Specifically, when the right front wheel target pressure is zero MPa, the brake ECU 200 stops the supply of electric power to the first motor 11 to turn off the first motor 11. Also, when the left front wheel target pressure is zero MPa, the brake ECU 200 stops the supply of electric power to the second motor 12 to turn off the second motor 12. Alternatively, when the right front wheel target pressure is not zero MPa but smaller than or equal to a predetermined reference pressure, the brake ECU 200 may turn off the first motor 11. Also, when the left front wheel target pressure is not zero MPa but smaller than or equal to a predetermined reference pressure, the brake ECU 200 may turn off the second motor 12.

Alternatively, the brake ECU 200 may reduce the driving force or rotational speed of the first motor 11 instead of turning off the first motor 11. In the case, the brake ECU 200 may reduce the driving force or rotational speed of the first motor 11 by reducing the duty ratio of the current to be pulse-supplied to the first motor 11. Also, the brake ECU 200 may reduce the driving force or rotational speed of the second motor 12 instead of turning off the second motor 12. Also in this case, the brake ECU 200 may reduce the driving force or rotational speed of the second motor 12 by reducing the duty ratio of the current to be pulse-supplied to the second motor 12.

Herein, if the motor is turned off and the fluid pressure regulating valve in the driving wheel is left opened, the driving wheel pressure will decrease although there is a demand for holding the driving wheel pressure. Accordingly, the brake ECU 200 holds the driving wheel pressure by closing the fluid pressure regulating valve corresponding to the driving wheel (S84). Specifically, when turning off the first motor 11, the brake ECU 200 holds the fluid pressure in the wheel cylinder 6RL by closing the fluid pressure regulating valve SLRL. Also, when turning off the second motor 12, the brake ECU 200 holds the fluid pressure in the wheel cylinder 6RR by closing the fluid pressure regulating valve SLRR. In addition, when closing the fluid pressure regulating valve SLRL or the fluid pressure regulating valve SLRR, the brake ECU 200 may supply an amount of current slightly greater than that when usually closing it. It is because the wheel cylinder pressure to be held may be decreased when the first motor 11 or the second motor 12 is turned off.

Figure 5:
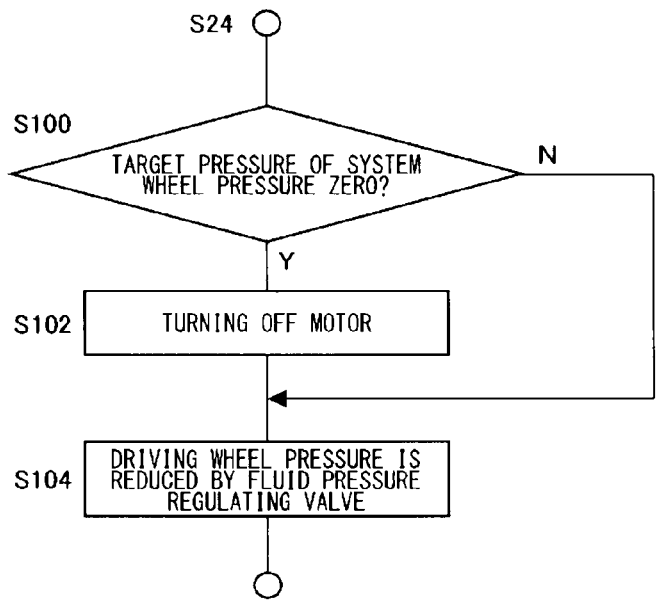
FIG. 5 is a flowchart illustrating the procedure of executing the pressure reducing control for the driving wheel pressure in S24 in FIG. 2, which is executed by the braking control apparatus according to the first embodiment.

FIG. 5 is a flowchart illustrating the procedure of executing the pressure reducing control for the driving wheel pressure in S24 in FIG. 2, which is executed by the braking control apparatus 100 according to the first embodiment. The brake ECU 200 determines whether the target pressure of the system wheel pressure is zero MPa or greater than zero MPa (S100).

When the target pressure of any one of the system wheel pressures is zero MPa (S100/Y), the brake ECU 200 turns off the motor for driving the pump that corresponds to the system wheel (S102). Specifically, in the case where the right front wheel target pressure is zero MPa when the fluid pressure regulating valve SLRL is to be opened so as to make the fluid pressure in the wheel cylinder 6RL approach the left rear wheel target pressure, the brake ECU 200 turns off the first motor 11. Also, in the case where the left front wheel target pressure is zero MPa when the fluid pressure regulating valve SLRR is to be opened so as to make the fluid pressure in the wheel cylinder 6RR approach the right rear wheel target pressure, the brake ECU 200 turns off the second motor 12.

Also in this case, the brake ECU 200 may turn off the first motor 11 when the right front wheel target pressure is not zero MPa but smaller than or equal to a predetermined reference value. Also, the brake 200 may turn off the second motor 12 when the left front wheel target pressure is not zero MPa but smaller than or equal to a predetermined reference value. It is the same as described above that the brake ECU 200 may reduce the driving force or rotational speed of the motor 11 instead of turning off the motor 11 and may reduce the driving force or rotational speed of the motor 12 instead of turning off the motor 12.

Even if the fluid pressure in the wheel cylinder 6FR has been already zero MPa when turning off the first motor 11 in this case, the brake ECU 200 opens both the fluid pressure regulating valve SLFR and the communication valve SRC1. Also, even if the fluid pressure in the wheel cylinder 6FL has been already zero MPa when turning off the second motor 12, the brake ECU 200 opens both the fluid pressure regulating valve SLFL and the communication valve SRC2. Thereby, the wheel cylinder in the system wheel can be communicated with the reservoir tank 3f and accordingly the wheel cylinder pressure in the system wheel can be more surely made to be zero MPa.

The vehicle stabilization control is executed when the brake pedal 1 is not operated by the driver and when it is determined that there is no demand for braking. Thereby, the brake ECU 200 maintains the state in which both the cut-off valves SMC1 and SMC2 are opened while the vehicle stabilization control is being executed. Accordingly, the wheel cylinder in the system wheel is communicated with each of the primary chamber 3a and the secondary chamber 3b, and hence the wheel cylinder pressure in the system wheel can be further surely made to be zero MPa.

Also, in this case where the fluid pressure in the wheel cylinder 6FR is not zero MPa but smaller than or equal to a predetermined reference pressure when the first motor 11 is to be turned off, the brake ECU 200 may open both the fluid pressure regulating valve SLFR and the communication valve SRC1. Also, in the case where the fluid pressure in the wheel cylinder 6FL is not zero MPa but smaller than or equal to the first reference pressure when the second motor 12 is to be turned off, the brake ECU200 may open both the fluid pressure regulating valve SLFL and the communication valve SRC2.

While the vehicle stabilization control is being executed, the brake ECU200 sets the threshold value of the master cylinder pressure, which is used for determining that there is a demand for braking, to a higher value than that when the vehicle stabilization control is not being executed. When determining that there has been a demand for braking, the brake ECU200 executes the braking control by cancelling the vehicle stabilization control. Hunting can be suppressed by setting the threshold value for determining that there has been a demand for braking to a higher value as stated above.

In the case where the right front wheel target pressure is smaller than or equal to the first reference pressure and the left rear wheel target pressure is smaller than or equal to a second reference pressure when the fluid pressure regulating valve SLRL is to be opened to reduce the fluid pressure in the wheel cylinder 6RL so as to make it approach the left rear wheel target pressure, the brake ECU200 may reduce the driving force or rotational speed of the first motor 11 Also, in the case where left front wheel target pressure is smaller than or equal to the first reference pressure and the right rear wheel target pressure is smaller than or equal to the second reference pressure when the fluid pressure regulating valve SLRR is to be opened to reduce the fluid pressure in the wheel cylinder 6RR so as to make it approach the right rear wheel target pressure, the brake ECU200 may reduce the driving force or rotational speed of the second motor 12.

In this case, the first reference pressure may be zero MPa. Also, the second reference pressure may be zero MPa. Alternatively, the first motor 11 may be turned off instead of reducing the driving force or rotational speed thereof. Also, the second motor 12 may be turned off instead of reducing the driving force or rotational speed thereof. Alternatively, the fact that the absolute value of the target pressure reduction gradient of the left rear wheel is greater than a predetermined reference gradient may be adopted as a condition instead of the fact that the left rear wheel target pressure is smaller than or equal to the second reference pressure. Also, the fact that the absolute value of the target pressure reduction gradient of the right rear wheel is greater than a predetermined reference gradient may be adopted as a condition instead of the fact that the right rear wheel target pressure is smaller than or equal to the second reference pressure.

As stated above, when it is not needed that the fluid pressure in the wheel cylinder 6RL is rapidly reduced even if the right front wheel target pressure is zero MPa, the brake ECU200 may continuously operate the first motor 11 without turning off the motor 11. Also, when it is not needed that the fluid pressure in the wheel cylinder 6RR is rapidly reduced even if the left front wheel target pressure is zero MPa, the brake ECU200 may continuously operates the second motor 12 without turning off the motor 12. Thereby, the state in which an increase in the pressure becomes difficult, occurring due to the turn-off of the first motor 11 or the second motor 12, can be avoided. Further, the frequency at which the first motor 11 or the second motor 12 is turned off can be reduced, and the starting current for initiating these motors thereafter can be suppressed.

When the target pressure of the system wheel is greater than zero MPa (S100/N), S102 will be skipped. Subsequently, the brake ECU200 reduces the driving wheel pressure by adjusting the opening degree of the fluid pressure regulating valve (S104).

(Second Embodiment)

Figure 6:
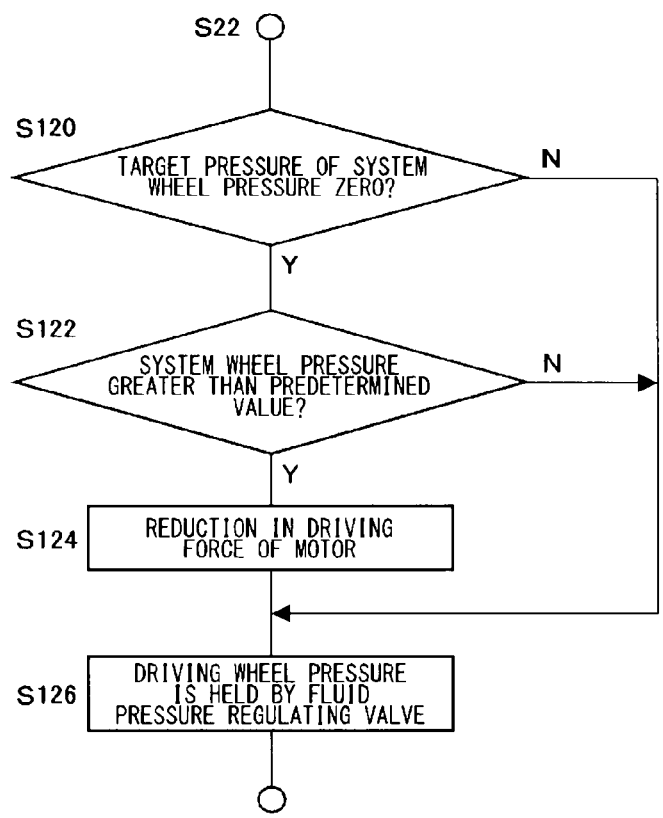
FIG. 6 is a flowchart illustrating the procedure of executing the holding control for the driving wheel pressure in S22 in FIG. 2, which is executed by a braking control apparatus according to a second embodiment.

FIG. 6 is a flowchart illustrating the procedure of executing the holding control for the driving wheel pressure in S22 in FIG. 2, which is executed by a braking control apparatus according to a second embodiment. The braking control apparatus according to the second embodiment is configured in the same way as the braking control apparatus 100 according to the first embodiment, unless specifically referred to herein. The vehicle in which the braking control apparatus is provided is also a rear-wheel-drive vehicle in the same way as in the first embodiment. Hereinafter, the same or like parts as in the first embodiment will be denoted with the same reference numerals, and descriptions thereof will be omitted.

The brake 200 determines whether the target pressure of the system wheel pressure is zero MPa or greater than zero MPa (S120). When the target pressure thereof is zero MPa (S120/Y), the brake ECU200 determines whether the system wheel pressure is greater than a predetermined acceptable residual pressure (S122). When the system wheel pressure is greater than the acceptable residual pressure (S122/Y), the brake ECU200 reduces the driving force or rotational speed of the motor for driving the pump that corresponds to the system wheel in order to reduce the residual pressure occurring in the wheel cylinder in the system wheel (S124).

Specifically, when the fluid pressure in the wheel cylinder 6FR is greater than the acceptable residual pressure, the brake ECU200 reduces the driving force or rotational speed of the first motor 11 by reducing the duty ratio of the current to be pulse-supplied to the motor 11 in order to reduce the residual pressure. Also, when the fluid pressure in the wheel cylinder 6FL is greater than the acceptable residual pressure, the brake ECU200 reduces the driving force or rotational speed of the second motor 2 by reducing the duty ratio of the current to be pulse-supplied to the second motor 12 in order to reduce the residual pressure. Subsequently, the brake ECU200 holds the driving wheel pressure by adjusting the opening degree of the fluid pressure regulating valve, while the driving force of the motor is being reduced (S126).

When the target pressure of the system wheel pressure is greater than zero MPa (S120/N), and when the system wheel pressure is smaller than or equal to a predetermined value (S122/N), the brake ECU200 skips S124 and holds the driving wheel pressure by adjusting the opening degree of the fluid pressure regulating valve while the driving force of the motor is being maintained (S126).

Figure 7:
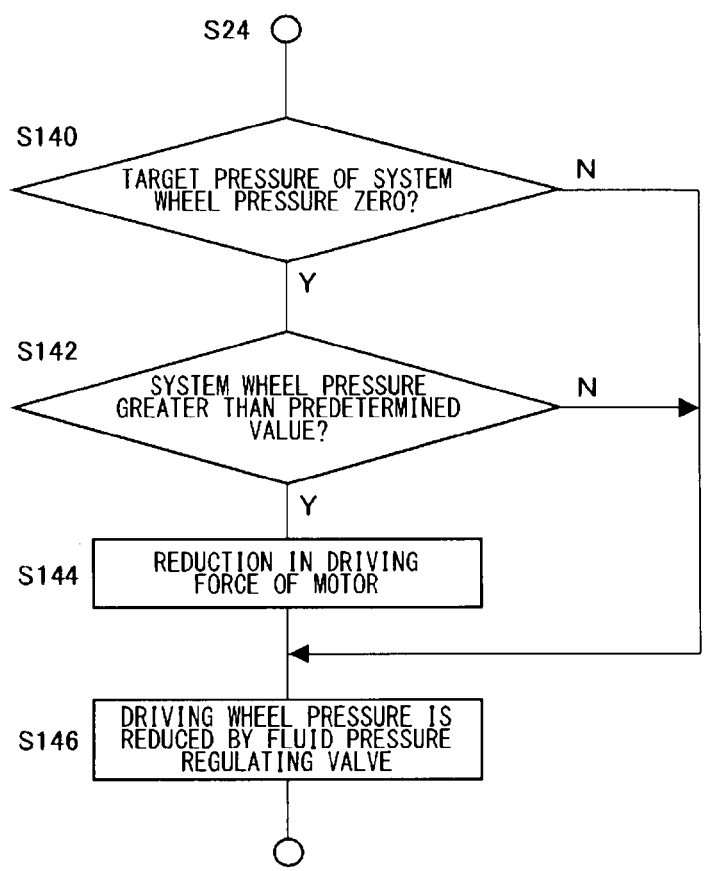
FIG. 7 is a flowchart illustrating the procedure of executing the pressure reducing control for the driving wheel pressure in S24 in FIG. 2, which is executed by the braking control apparatus according to the second embodiment.

FIG. 7 is a flowchart illustrating the procedure of executing the pressure reducing control for the driving wheel pressure in S24 in FIG. 2, which is executed by the braking control apparatus according to the second embodiment. The brake ECU200 determines whether the target pressure of the system wheel pressure is zero MPa, or greater than zero MPa (S140). When the target pressure of the system wheel pressure is zero MPa (S140/Y), the brake ECU200 determines whether the system wheel pressure is greater than a predetermined acceptable residual pressure (S142). When the system wheel pressure is greater than the acceptable residual pressure (S142/Y), the brake ECU200 reduces the driving force or rotational speed of the motor to reduce the residual pressure (S144).

In this case, it is the same as stated above that, when the fluid pressure in the wheel cylinder 6FR is greater than the acceptable residual pressure, the brake ECU200 reduces the driving force or rotational speed of the first motor 11 to reduce the residual pressure, and that, when the fluid pressure in the wheel cylinder 6FL is greater than the acceptable residual pressure, the brake ECU200 reduces the driving force or rotational speed of the second motor 12 to reduce the residual pressure. Subsequently, the brake ECU200 reduces the driving wheel pressure by adjusting the opening degree of the fluid pressure regulating valve while the driving force of the motor is being reduced (S146).

When the target pressure of the system wheel pressure is greater than zero MPa (S140/N), and when the system wheel pressure is smaller than or equal to the acceptable residual pressure (S142/N), the brake ECU200 skips S144 and reduces the driving wheel pressure by adjusting the opening degree of the fluid pressure regulating valve, while the driving force of the motor is being maintained (S146).

Alternatively, the braking control apparatus 100 may be provided in a four-wheel-drive vehicle. The vehicle may be provided with the front-wheel motor for driving the front wheels and the rear-wheel motor for driving the rear wheels. When braking force is provided to a wheel by the residual pressure in the system wheel pressure, the brake ECU200 may drive the motor for driving the wheel so as to offset the braking force. Thereby, an influence on the driver's operability of the vehicle by the residual pressure can be suppressed.
(Third Embodiment)

Figure 8:
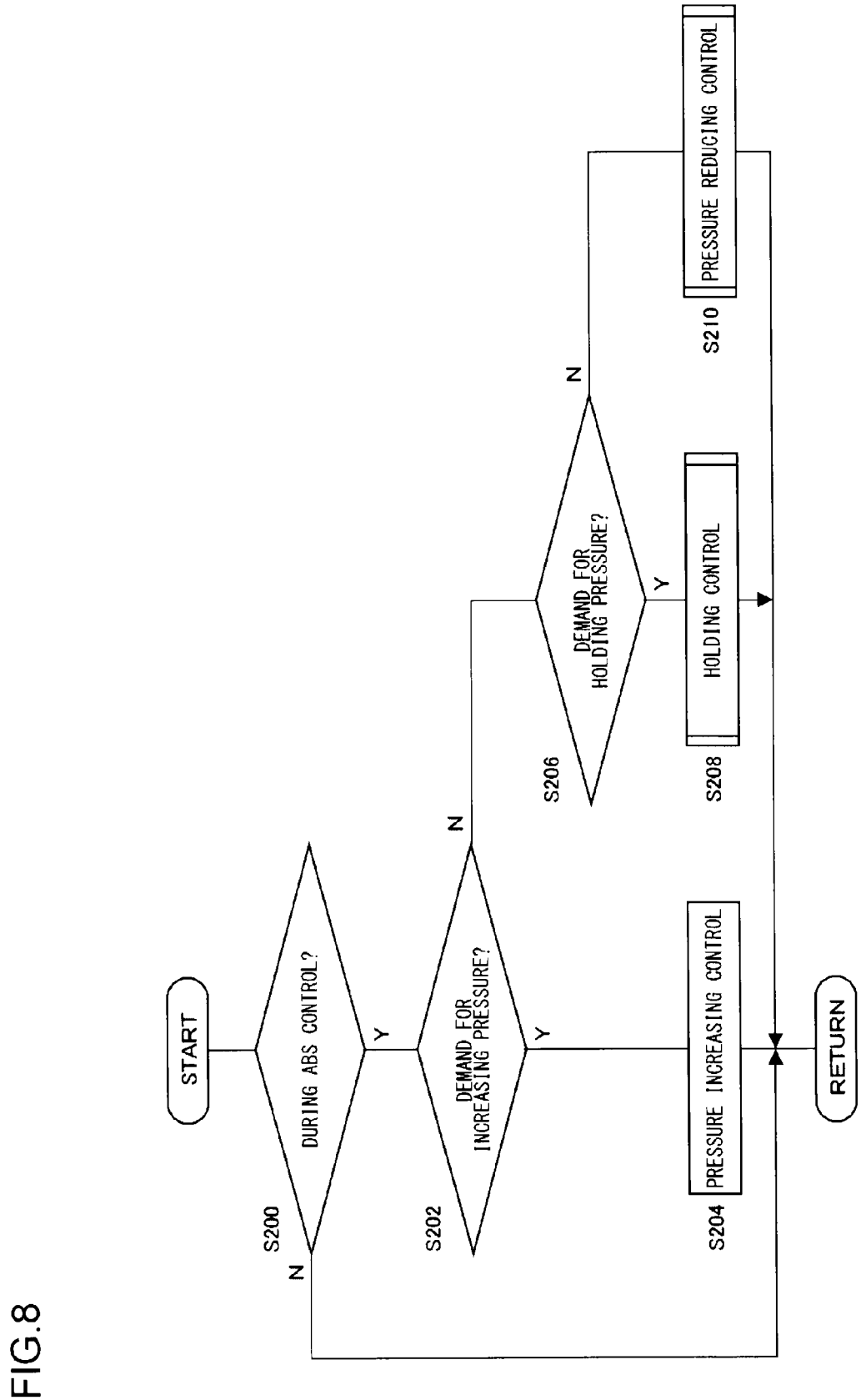
FIG. 8 is a flowchart illustrating the procedure of the braking control by a braking control apparatus according to a third embodiment.

FIG. 8 is a flowchart illustrating the procedure of the braking control by a braking control apparatus according to a third embodiment. The braking control apparatus according to the third embodiment is configured in the same way as the braking control apparatus 100 according to the first embodiment, unless specifically referred to herein. The vehicle in which the braking control apparatus is provided is also a rear-wheel-drive vehicle in the same way as in the first embodiment. Hereinafter, the same or like parts as in the first embodiment will be denoted with the same reference numerals, and descriptions thereof will be omitted.

The brake ECU200 determines whether the ABS (Antilock Brake System) control is being executed with reference to the ABS flag that is set to be ON while the ABS control is being executed (S200). The ABS control is a publicly known technique, so its description will be omitted. When the ABS control is not being executed (S200/N), the processing in this flowchart is once ended.

When the ABS control is being executed (S200/Y), the brake ECU200 determines whether there is a demand for increasing the wheel cylinder pressure in any one of the wheels using detection results of the stroke sensor 2 and that of the fluid pressure sensors 17 and 18, and the like (S202). When there is a demand for increasing the wheel cylinder pressure in any one of the wheels (S202/Y), the brake ECU200 executes the pressure increasing control for the wheel cylinder pressure in the wheel, assuming that the wheel cylinder pressure is the wheel pressure to be controlled (S204). In the pressure increasing control, the brake ECU200 operates the motor for driving the pump that corresponds to the wheel to be controlled and adjusts the opening degree of the fluid pressure regulating valve that corresponds to the wheel to be controlled.

When there is no demand for increasing the wheel cylinder pressure (S202/N), the brake ECU200 determines whether there is a demand for holding the wheel cylinder pressure in any one of the wheels using detection results of the stroke sensor 2 and that of the fluid pressure sensors 17 and 18, and the like (S206). When there is a demand for holding the wheel cylinder pressure in any one of wheels (S206/Y), the brake ECU200 executes the holding control for the wheel cylinder pressure in the wheel, assuming that the wheel cylinder pressure is the wheel pressure to be controlled (S208). The holding control for the wheel pressure to be controlled will be described later.

When there is no demand for both increasing and holding the wheel cylinder pressure in any one of the wheels (S206/N), the brake ECU200 determines that there has been a demand for reducing the wheel cylinder pressure in the wheel, and executes the pressure reducing control for the wheel cylinder pressure in the wheel, assuming that the wheel cylinder pressure is the wheel pressure to be controlled (S210). The pressure reducing control for the wheel pressure to be controlled will also be described later.

Figure 9:
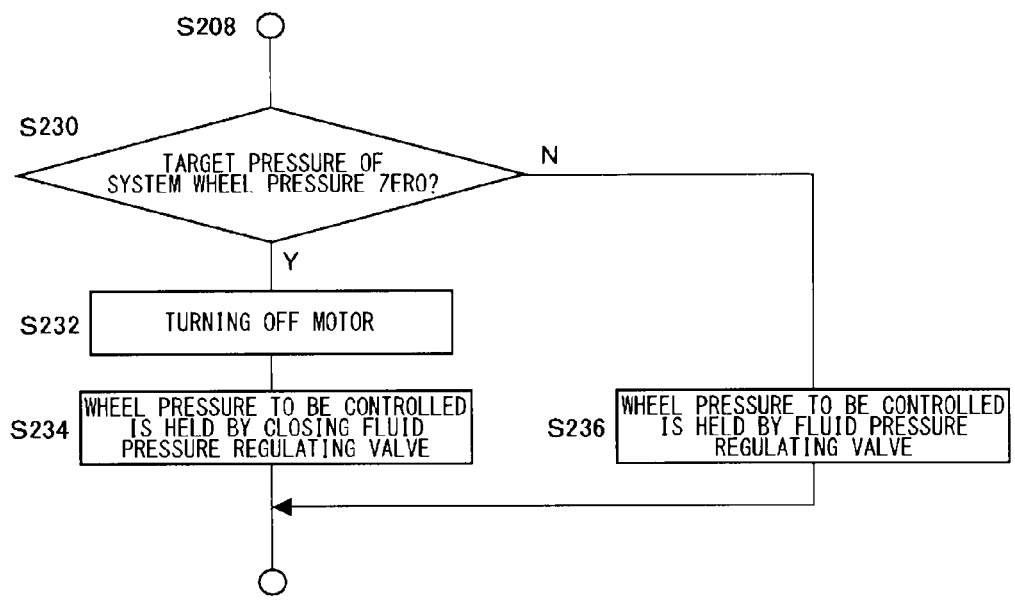
FIG. 9 a flowchart illustrating the procedure of executing the holding control for the wheel pressure to be controlled in S208 in FIG. 8.

FIG. 9 is a flowchart illustrating the procedure of executing the holding control for the wheel pressure to be controlled in S208 in FIG. 8. The brake ECU200 determines whether the target pressure of the wheel cylinder pressure in the system wheel of the wheel to be controlled is zero MPa or greater than zero MPa (S230). For example, when the fluid pressure in the wheel cylinder 6RL is to be held, the brake ECU200 determines whether the target pressure of the wheel cylinder pressure in the right front wheel, which is the system wheel of the left rear wheel, is zero MPa or greater than zero MPa. Also, when the fluid pressure in the wheel cylinder 6RR is to be held, the brake ECU200 determines whether the target pressure of the wheel cylinder pressure in the left front wheel, which is the system wheel of the right rear wheel, is zero MPa or greater than zero MPa.

When the target pressure of the system wheel pressure is greater than zero MPa (S230/N), the brake ECU200 holds the wheel cylinder pressure by adjusting the opening degree of the fluid pressure regulating valve, while the motor is being turned on (S236). In this case, the method of holding the wheel cylinder pressure is the same as in S86 in FIG. 4. When the target pressure of the system wheel pressure is zero MPa (S230/Y), the brake ECU200 turns off the motor for driving the pump that corresponds to the system wheel (S232). In this case, the control method is the same as in S84 in FIG. 4.

Herein, in order to avoid that the wheel pressure to be controlled may be decreased by turning off the motor, the brake ECU200 holds the wheel pressure to be controlled by closing the fluid pressure regulating valve corresponding to the wheel to be controlled (S234). For example, when turning off the first motor 11, the brake ECU200 holds the fluid pressure in the wheel cylinder 6RL by closing the fluid pressure regulating valve SLRL. In this case, the brake ECU200 closes the fluid pressure regulating valve SLRL by supplying thereto a slightly larger amount of current than usually closing. It is because the wheel cylinder pressure to be held may be decreased when the first motor 11 is turned off due to the relief control. Also, when turning off the second motor 12, the brake ECU200 holds the fluid pressure in the wheel cylinder 6RR by closing the fluid pressure regulating valve SLRR.

Figure 10:
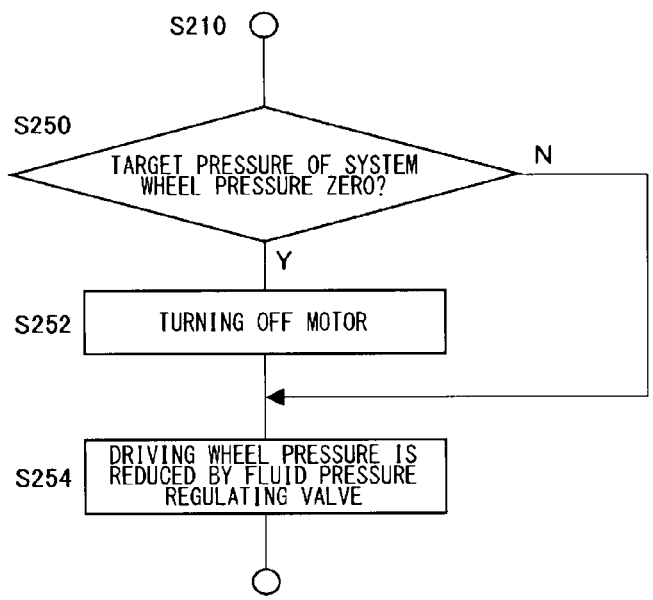
FIG. 10 is a flowchart illustrating the procedure of executing the pressure reducing control for the wheel pressure to be controlled in S210 in FIG. 8.

FIG. 10 is a flowchart illustrating the procedure of executing the pressure reducing control for the wheel pressure to be controlled in S210 in FIG. 8. The brake ECU200 determines whether the target pressure of the wheel cylinder pressure in the system wheel of the wheel to be controlled is zero MPa or greater than zero MPa (S250). When the target pressure of either system wheel pressure is zero MPa (S250/Y), the brake ECU200 turns off the motor for driving the pump that corresponds to the system wheel (S252). When the target pressure of the system wheel pressure is greater than zero MPa (S250/N), the brake ECU200 skips S252. Subsequently, the brake ECU200 reduces the wheel pressure to be controlled by adjusting the opening degree of the fluid pressure regulating valve (S254). In this case, the control method is the same as in S104 in FIG. 5.
(Fourth Embodiment)

Figure 11:
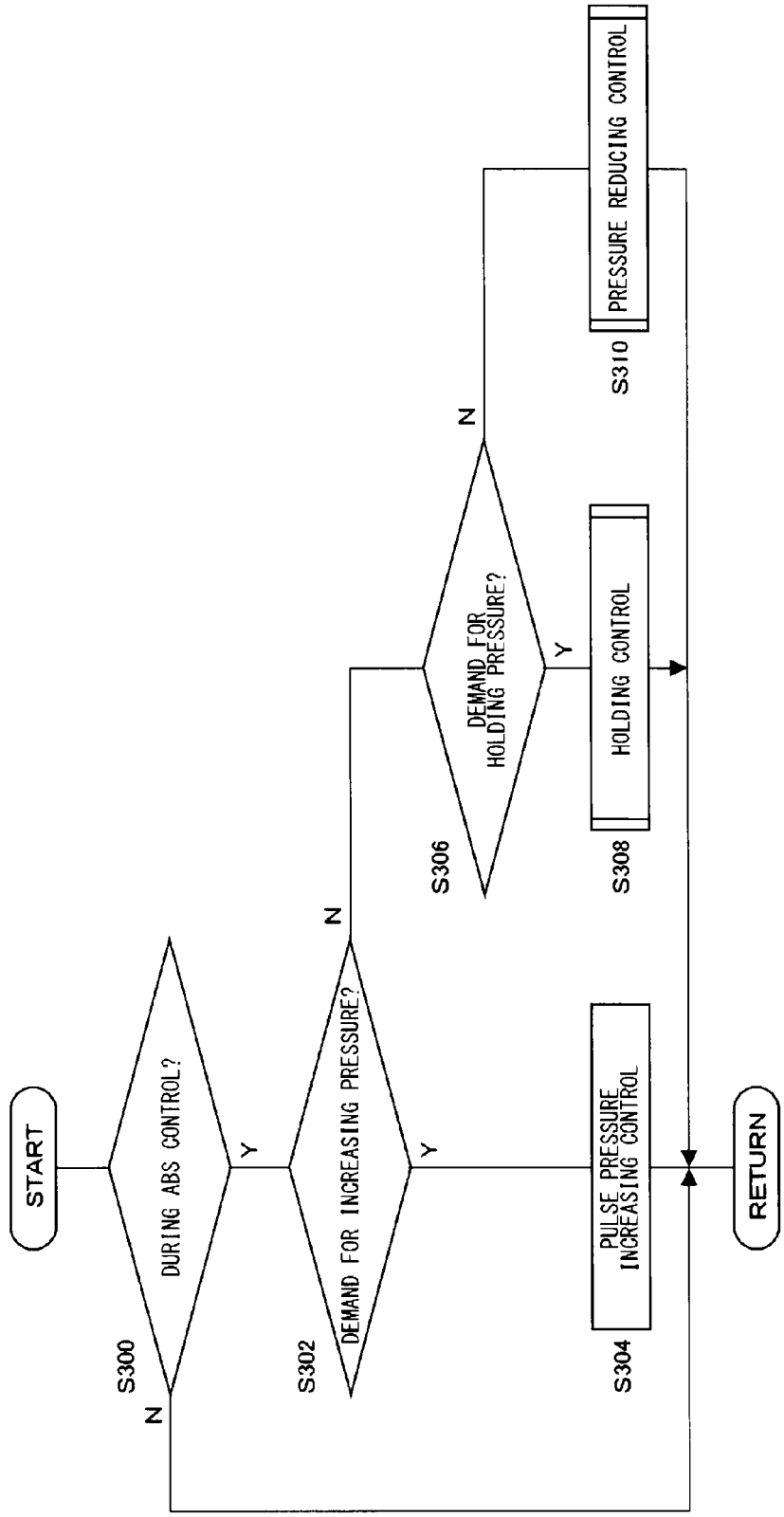
FIG. 11 is a flowchart illustrating the procedure of the braking control by a braking control apparatus according to a fourth embodiment.

FIG. 11 is a flowchart illustrating the procedure of the braking control by a braking control apparatus according to a fourth embodiment. The braking control apparatus according to the fourth embodiment is configured in the same way as the braking control apparatus 100 according to the first embodiment, unless specifically referred to herein. Hereinafter, the same or like parts as in the first embodiment will be denoted with the same reference numerals, and descriptions thereof will be omitted.

The brake ECU200 determines whether the ABS control is being executed with reference to the aforementioned ABS flag (S300). When the ABS control is not being executed (S300/N), the processing in this flowchart is once ended.

When the ABS control is being executed (S300/Y), the brake ECU200 determines whether there is a demand for increasing the wheel cylinder pressure in any one of the wheels using detection results of the stroke sensor 2 and that of the fluid pressure sensors 17 and 18, and the like (S302). When there is a demand for increasing the wheel cylinder pressure in any one of the wheels (S302/Y), the brake ECU200 executes the pulse pressure increasing control for the wheel cylinder pressure in the wheel, assuming that the wheel cylinder pressure is the wheel pressure to be controlled (S304).

Figure 12A:
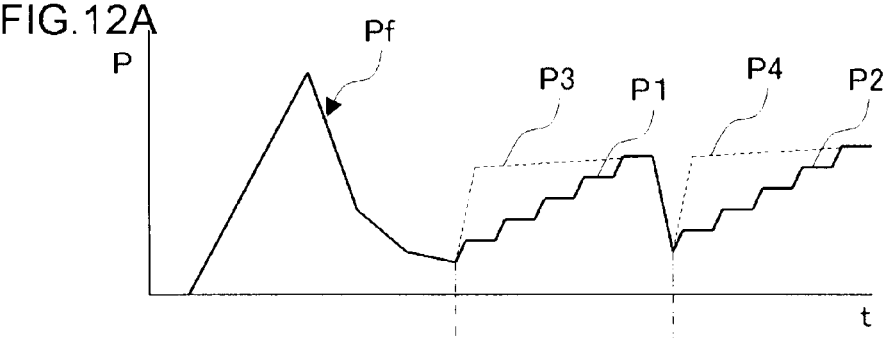
FIG. 12($a$) is a graph illustrating the wheel pressure to be controlled Pf occurring when the pulse pressure increasing control is executed in S304 in FIG. 11.
Figure 12B:
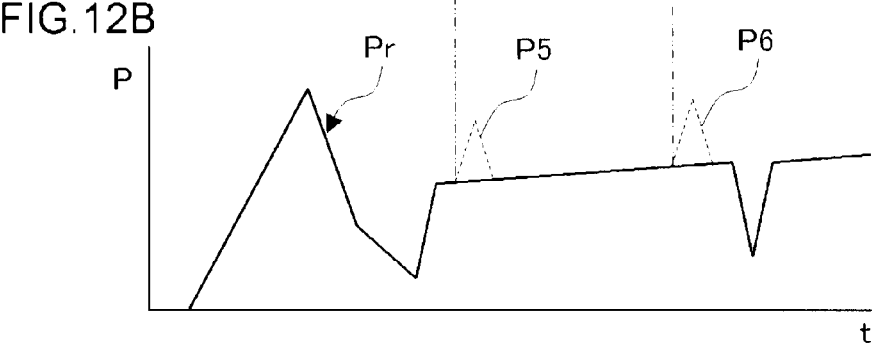

FIG. 12(a) is a graph illustrating the wheel pressure to be controlled Pf occurring when the pulse pressure increasing control is executed in S304 in FIG. 11; and FIG. 12(b) is a graph illustrating the system wheel pressure Pr at the time. FIGS. 12(a) and 12(b) illustrate the case where, when there is a demand for increasing the wheel cylinder pressure in the right front wheel or the left front wheel, the wheel cylinder pressure in the left rear wheel or the right rear wheel, which is the system wheel of the aforementioned wheel, is held. In such a case, the wheel pressure to be controlled Pf is pulse pressure increased, as illustrated by P1 and P2 in FIG. 12(a).

The case where such pulse pressure increasing control is not executed is illustrated by the dashed lines in FIGS. 12(a) and 12(b). When the wheel pressure to be controlled Pf is rapidly increased without executing the pulse pressure increasing control, as illustrated by P3 and P4 in FIG. 12(a), the brake ECU200 increases the rotation frequency of the first motor 11 or the second motor 12 by increasing the current to be supplied thereto. Although the brake ECU200 adjusts the opening degree of the fluid pressure regulating valve SLRL or the fluid pressure regulating valve SLRR to continuously hold the system wheel pressure Pr, the brake ECU200 cannot deal with an increase in the rotation frequency of the first motor 11 or the second motor 12 completely, thereby causing the system wheel pressure Pr, which is to be held, to be increased momentarily, as illustrated by P5 and P6 in FIG. 12(b).

In such a case as the fourth embodiment, by executing the pulse pressure increasing control, an influence on the system wheel pressure Pr, occurring due to the increase in the wheel pressure to be controlled Pf, can be suppressed. Accordingly, the system wheel pressure Pr can be more suitably controlled.

Referring back to FIG. 11, when there is no demand for increasing the wheel cylinder pressure (S302/N), the brake ECU200 determines whether there is a demand for holding the wheel cylinder pressure in any one of the wheels using detection results of the stroke sensor 2 and that of the fluid pressure sensors 17 and 18, and the like (S306). When there is a demand for holding the wheel cylinder pressure in any one of the wheels (S306/Y), the brake ECU200 executes the holding control for the system wheel pressure (S308). The holding control for the system wheel pressure will be described later.

When there is no demand for both increasing and holding the wheel cylinder pressure (S306/N), the brake ECU200 determines that there has been a demand for reducing the wheel cylinder pressure in the wheel, and executes the pressure reducing control for the wheel cylinder pressure in the wheel (S310). The pressure reducing control for the wheel pressure to be controlled will also be described later.

Figure 13:
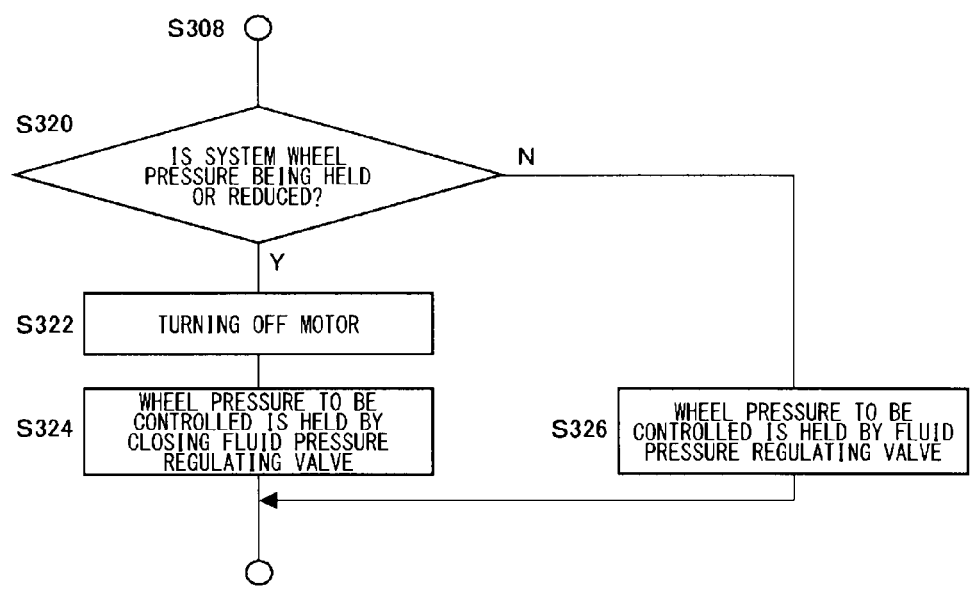
FIG. 13 is a flowchart illustrating the procedure of executing the holding control for the wheel pressure to be controlled in S308 in FIG. 11.

FIG. 13 is a flowchart illustrating the procedure of executing the holding control for the wheel pressure to be controlled in S308 in FIG. 11. The brake ECU200 determines whether either the holding control or the pressure reducing control for the system wheel pressure in the system wheel of the wheel to be controlled is being executed, with reference to whether there is a demand for either holding or reducing the aforementioned wheel cylinder pressure (S320).

When the holding control or pressure reducing control for the system wheel is being executed (S320/Y), neither the wheel pressure to be controlled nor the system wheel pressure is being executed; and hence the brake ECU200 turns off the motor commonly used in each of the control for the wheel pressure to be controlled and for the system wheel pressure (S322). Thereby, the power consumed by the motor can be reduced. If the fluid pressure regulating valve is opened in spite of turning off the motor, the system wheel pressure is decreased in spite of a demand for holding the wheel pressure to be controlled. Accordingly, the brake ECU200 holds the wheel pressure to be controlled by closing the fluid pressure regulating valve (S324).

When the pressure increasing control for the system wheel pressure is being executed (S320/N), the brake ECU200 holds the wheel pressure to be controlled by adjusting the opening degree of the fluid pressure regulating valve while maintaining the operation of the motor (S326).

Figure 14:
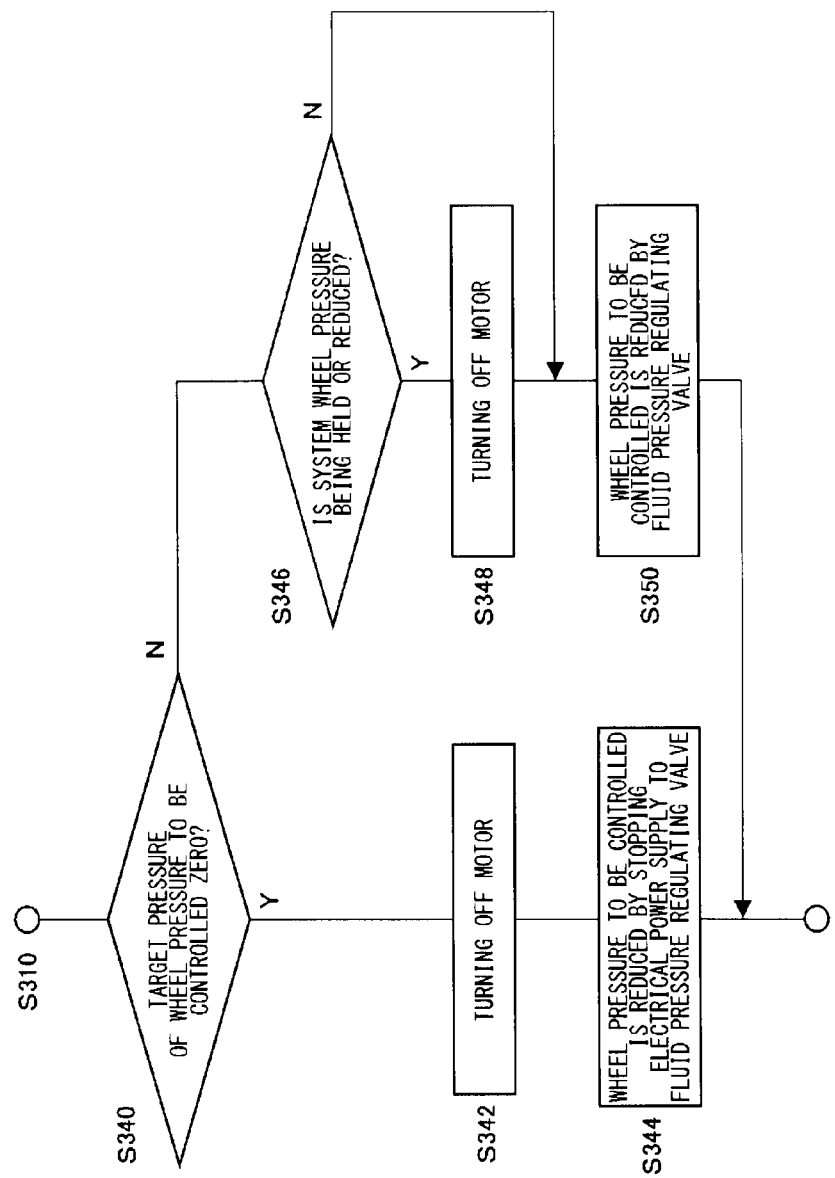
FIG. 14 is a flowchart illustrating the procedure of executing the pressure reducing control for the wheel pressure to be controlled in S310 in FIG. 11.

FIG. 14 is a flowchart illustrating the procedure of executing the pressure reducing control for the wheel pressure to be controlled in S310 in FIG. 11. The brake ECU200 determines whether the target pressure of the wheel cylinder pressure in the system wheel of the wheel to be controlled is zero MPa (S340). When the target pressure of the wheel pressure to be controlled is zero MPa (S340/Y), the brake ECU200 turns off the motor commonly used in each of the control for the wheel pressure to be controlled and for the system wheel pressure, in order to rapidly reduce the wheel pressure to be controlled at a high pressure reduction gradient (S342). When the motor is turned off, the brake ECU200 opens the fluid pressure regulating valve to the maximum degree by stopping the power supply thereto such that the wheel pressure to be controlled is reduced (S344).

Specifically, when rapidly reducing the fluid pressure in the wheel cylinder 6FR, which is the wheel pressure to be controlled, so as to make it approach, for example, zero MPa of the right front wheel target pressure, the brake ECU200 turns off the first motor 11 and opens the fluid pressure regulating valve SLFR to the maximum degree. Also, when rapidly reducing the fluid pressure in the wheel cylinder 6FL, which is the wheel pressure to be controlled, so as to make it approach zero MPa of the left front wheel target pressure, the brake ESU200 turns off the second motor 12 and opens the fluid pressure regulating valve SLFL to the maximum degree.

In the aforementioned control, instead of the fact that the target pressure of the wheel pressure to be controlled is zero MPa, the fact that the target pressure of the wheel pressure to be controlled is smaller than or equal to a predetermined reference value may be adopted as a condition, or the fact that the absolute value of the target pressure reduction gradient is greater than or equal to a predetermined reference value may be adopted as a condition. Further, the driving force or rotational speed of the first motor 11 or the second motor 12 may be reduced instead of turning off the first motor 11 or the second motor 12.

In the case where the target pressure of the wheel pressure to be controlled is zero MPa even when the system wheel pressure is being increased, the brake ECU200 turns off the motor commonly used in each of the control for the wheel pressure to be controlled and for the system wheel pressure, in order to make the pressure reduction gradient of the wheel pressure to be controlled large. The wheel pressure to be controlled and the system wheel pressure in this case will be described with reference to FIGS. 15(*a*) and 15(*b*).

Figure 15A:
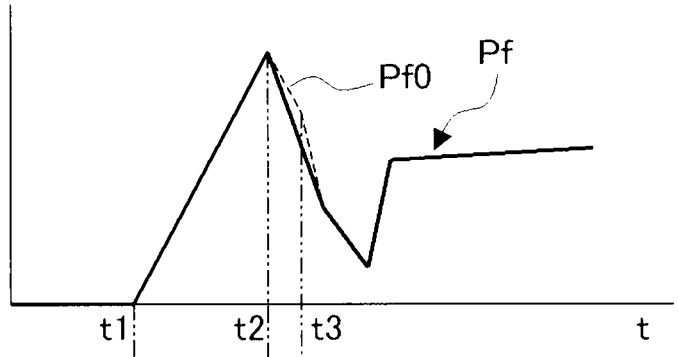
FIG. 15($a$) is a graph illustrating the wheel pressure to be controlled, which has been reduced by stopping electrical power supply to a fluid pressure regulating valve.
Figure 15B:
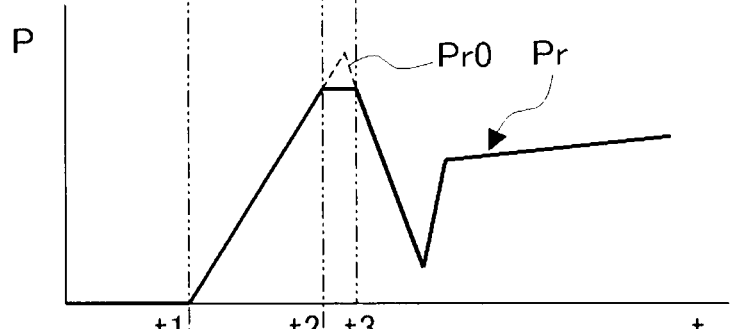
Figure 15C:
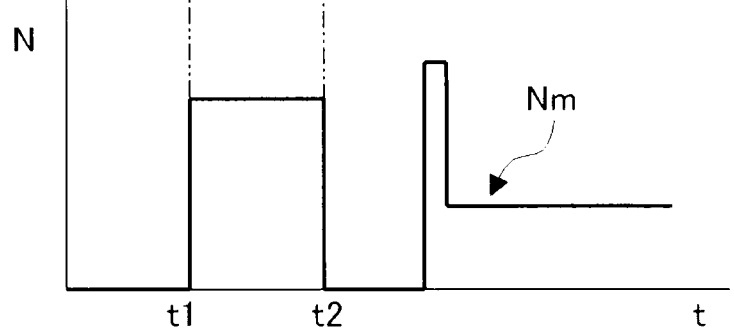

FIG. 15(*a*) is a graph illustrating the wheel pressure to be controlled Pf, which has been reduced by stopping electrical power supply to the fluid pressure regulating valve. FIG. 15(*b*) is a graph illustrating the system wheel pressure Pr at the time. In FIGS. 15(*a*) and 15(*b*), both the horizontal axes represent time t (sec) and both the vertical axes represent the wheel cylinder pressure P (MPa), and both graphs illustrate the case where the wheel cylinder pressure in the front wheel is assumed to be the wheel pressure to be controlled Pf and the wheel cylinder pressure in the rear wheel is assumed to be the system wheel pressure Pr, respectively. FIG. 15(*c*) is a graph illustrating the rotation frequency Nm of the motor commonly used in each of the control for the wheel pressure to be controlled and for the system wheel pressure. In FIG. 15(*c*), the horizontal axis represents time (t) and the vertical axis represents the rotation frequency N (rpm).

The dashed lines Pf0 and Pr0 illustrated in FIGS. 15(*a*) and 15(*b*) respectively represent the wheel pressure to be controlled and the system wheel pressure when the rotation of the motor is being maintained. After the rotation of the motor is initiated at t1, both the wheel pressure to be controlled Pf and the system wheel pressure Pr are increased. When the target pressure of the wheel pressure to be controlled Pf is zero MPa at t2, or when the absolute value of the target pressure reduction gradient is greater than or equal to a reference value, the wheel pressure to be controlled Pf can be rapidly reduced as illustrated in FIG. 15(*a*) by stopping the electrical power supply to the motor to stop the rotation of the motor as illustrated 15(*c*). At the time, an increase in the system wheel pressure Pr is suppressed to the extent where the ABS control is not affected, between t2 and t3 as illustrated in FIG. 15(*b*), thereby allowing the system wheel pressure to be held for a short period of time.

Referring back to FIG. 14, when the target pressure of the wheel pressure to be controlled is not zero MPa (S340/N), the brake ECU200 determines whether the system wheel pressure is being held or reduced, with reference to whether there is a demand for holding or reducing the wheel cylinder pressure in the system wheel of the wheel to be controlled (S346). When the system wheel pressure is being held or reduced (S346/Y), the brake EC200 turns off the motor commonly used in each of the control for the wheel pressure to be controlled and for the system wheel pressure (S348). When the motor is turned off, the brake ECU200 reduces the wheel pressure to be controlled by adjusting the opening degree of the fluid pressure regulating valve (S350).

When the system wheel pressure is not being held or reduced (S346/N), the brake ECU200 reduces the wheel pressure to be controlled by adjusting the opening degree of the fluid pressure regulating valve while turning on the motor commonly used in each of the control for the wheel pressure to be controlled and for the system wheel pressure (S350).

(Fifth Embodiment)

Figure 16:
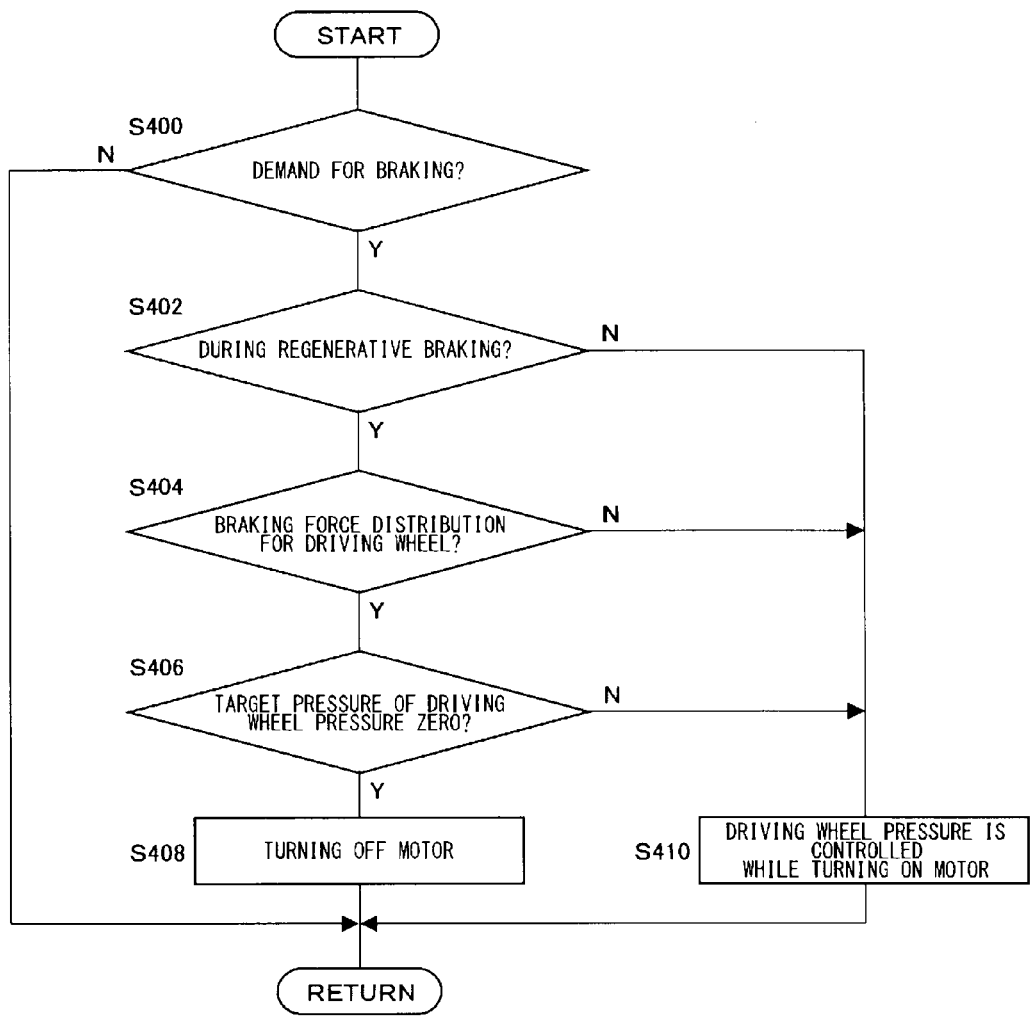
FIG. 16 is a flowchart illustrating the procedure of the braking control for the driving wheel by a braking control apparatus according to a fifth embodiment.

FIG. 16 is a flowchart illustrating the procedure of the braking control for the driving wheel by a braking control apparatus according to a fifth embodiments. The braking control apparatus according to the fifth embodiment is configured in the same way as the braking control apparatus 100 according to the first embodiment, unless specifically referred to herein. The braking control apparatus according to the fifth embodiment is provided in a front-wheel-drive vehicle. The vehicle is provided with a regenerative brake unit (not illustrated) configured to generate braking force in the left front wheel and the right front wheel by regenerative control of an electrical motor. However, the brake control apparatus according to the fifth embodiment may be provided in a rear-wheel-drive vehicle in which a regenerative brake unit (not illustrated) configured to generate braking force in the left rear wheel and the right rear wheel by regenerative control of an electrical motor. Alternatively, the brake control apparatus according thereto may be provided in a vehicle in which a hybrid system is mounted. Hereinafter, the same or like parts as in the first embodiment will be denoted with the same reference numerals, and descriptions thereof will be omitted.

The brake ECU200 determines whether there is a demand for braking, which is to provide braking force to a vehicle, using detection results of the stroke sensor 2, and the like (S400). When there is no demand for braking (S400/N), the processing in this flowchart is once ended.

When executing the regenerative braking, the brake ECU200 turns on a regenerative braking flag. When there is a demand for braking (S400/Y), the brake ECU200 determines whether the regenerative braking is being executed with reference to the regenerative braking flag (S402). When the regenerative braking is not being executed although there is a demand for braking (S402/N), the brake ECU200 controls the driving wheel pressure while turning on the motor because it is needed to provide braking force to the vehicle by increasing the wheel cylinder pressure (S410).

When the regenerative braking is being executed (S402/Y), the brake ECU200 determines whether braking force distribution for driving wheel is being executed (S404). Herein, the braking force distribution for driving wheel means that distribution of the braking force is controlled such that the braking force is provided to the driving wheel and not provided to the non-driving wheel. A larger amount of electrical power can be obtained in the regenerative braking by providing the braking force only to the driving wheel as stated above. Because the vehicle in the fifth embodiment is a front-wheel-drive, the brake ECU200 determines whether the driving force distribution for front vehicle, in which the braking force is provided to the front wheel and the braking force to be provided to the rear wheel is made to be zero MPa, is being executed by determining whether the target pressure of the wheel cylinder pressure in the rear wheel is zero MPa. When the braking force distribution for driving force is not being executed (S404/N), the brake ECU200 controls the driving wheel pressure while turning on the motor because it is also needed to provide the braking force to the non-driving wheel, i.e., the rear wheel (S410).

When the regenerative control is to be executed, the brake ECU200 sets the driving wheel target pressure, i.e., the right front wheel target pressure and the left front wheel target pressure, based on the execution of the regenerative control. Because of this, when the braking force distribution for driving wheel is being executed (S404/Y), the brake ECU200 determines whether either of the right front wheel target pressure and the left front wheel target pressure, which is the target pressure of the wheel cylinder pressure in the driving wheel, is zero MPa (S406). When the right front wheel target pressure or the left front wheel target pressure is greater than zero MPa (S406/N), the brake ECU200 controls the driving wheel pressure, while turning on the first motor 11 when the right front wheel target pressure is greater than zero MPa, or while turning on the second motor 12 when the left front wheel target pressure is greater than zero MPa, because it is needed to provide the braking force to the front wheel by increasing the wheel cylinder pressure (S410).

When the right front wheel target pressure or the left front wheel target pressure is zero MPa (S406/Y), the brake ECU200 provides the braking force to the driving wheel only with the regenerative braking by turning off the motor used in the control of the target pressure. Specifically, when the right front wheel target pressure is zero MPa, the brake ECU200 provides the braking force to the right front wheel only with the regenerative braking by turning off the first motor 11 and opening the fluid pressure regulating valve SLFR. Also, when the left front wheel target pressure is zero MPa, the brake ECU200 provides the braking force to the left front wheel only with the regenerative braking by turning off the second motor 12 and opening the fluid pressure regulating valve SLFL (S408).

In the case where the left rear wheel target pressure is zero MPa when the fluid pressure regulating valve SLFR is to be opened so as to make the fluid pressure in the wheel cylinder 6FR approach the right front wheel target pressure preset based on the execution of the regenerative control as stated above, the brake ECU200 turns off the first motor 11. Also, in the case where the right rear wheel target pressure is zero MPa when the fluid pressure regulating valve SLFL is to be opened so as to make the fluid pressure in the wheel cylinder 6FL approach the left front wheel target pressure preset based on the execution of the regenerative control, the brake ECU200 turns off the second motor 12.

Alternatively, in the case where the left rear wheel target pressure is smaller than or equal to the first reference pressure when the fluid pressure regulating valve SLRL is to be opened so as to make the fluid pressure in the wheel cylinder 6RL approach the right front wheel target pressure preset based on the execution of the regenerative control, the brake ECU200 may reduce the driving force or rotational speed of the first motor 11. Also, in the case where the left front wheel target pressure is smaller than or equal to the first reference pressure when the fluid pressure regulating valve SLRR is to be opened so as to make the fluid pressure in the wheel cylinder 6RR approach the right rear wheel target pressure preset based on the execution of the regenerative control, the brake ECU200 may reduce the driving force or rotational speed of the second motor 12.

Figure 17:
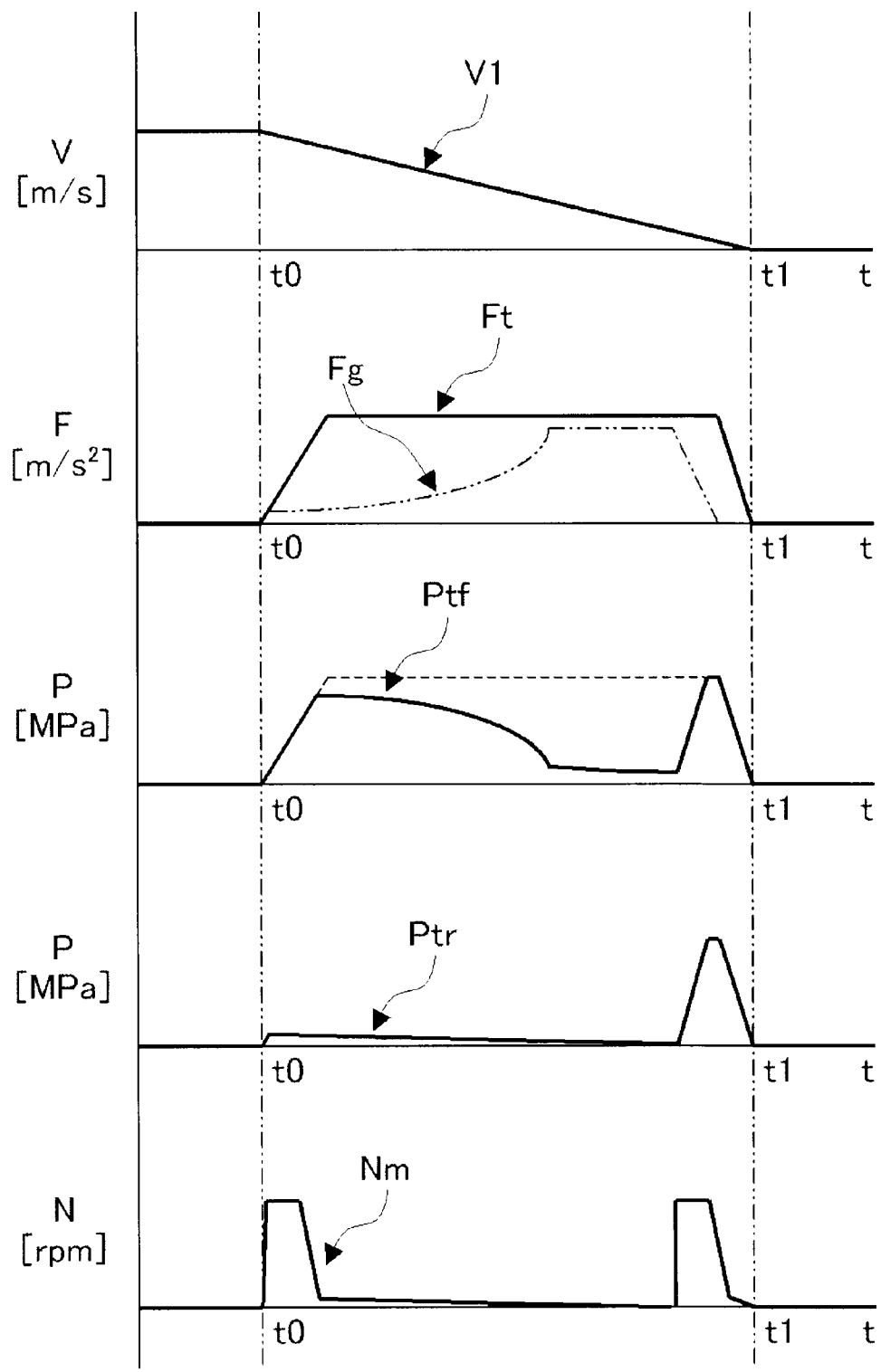
FIG. 17 is a graph illustrating the vehicle speed V1, the target deceleration Ft, the front wheel target pressure Ptf, the rear wheel target pressure Ptr, and the rotation frequency Nm of the motor, while the regenerative braking is being executed.

FIG. 17 is a graph illustrating the vehicle speed V1, the target deceleration Ft, the front wheel target pressure Ptf, the rear wheel target pressure Ptr, and the rotation frequency of the motor Nm, while the regenerative braking is being executed. All the horizontal axes in FIG. 17 represent time t. The regenerative braking will be described in which a demand for braking is provided by the driver depressing the brake pedal 1 at the time t0 and the vehicle speed V1 is reduced before the vehicle is stopped at the time t1.

When a demand for braking is provided, the brake ECU200 maintains the target deceleration Ft at a constant value after rapidly increasing the target deceleration Ft, and rapidly reduces the target deceleration Ft when the vehicle speed V1 is close to zero MPa. At the time, the brake ECU200 gradually increases the regenerative target deceleration Fg, which is the target deceleration in the regenerative braking, and maintains it at a constant value so as to match it with the target deceleration Ft, when increased to the same value as the target deceleration Ft. When the vehicle speed V1 is decelerated to predetermined speed, for example, to 10 km/h, etc., the brake ECU200 rapidly reduces the regenerative target deceleration Fg before rapidly reducing the target deceleration Ft.

When gradually increasing the regenerative target deceleration Fg, the brake ECU200 gradually reduces the front wheel target pressure Ptf such that the total with the regenerative target deceleration Fg becomes the target deceleration Ft. The brake ECU200 gradually reduces the rotation frequency Nm of each of the first motor 11 and the second motor 12 in accordance with the reduction in the front wheel target pressure Ptf. When the front wheel target pressure Ptf becomes zero MPa, the brake ECU200 turns off the first motor 11 and the second motor 12. Thereby, the residual pressure occurring in the rear wheel target pressure Ptr can be suppressed.

When the vehicle speed V is decelerated to predetermined speed, the brake ECU200 increases the front wheel target pressure Ptf to replace the regenerative braking force with the braking force by the operating fluid pressure. In accordance with this, the brake ECU200 increases the rotation frequency Nm of each of the first motor 11 and the second motor 12. At the time, the brake ECU200 gradually closes the fluid pressure regulating valves SLFR and SLFL to suppress hydraulic fluctuation.

The present invention should not be limited to the aforementioned embodiments, and an appropriate combination of each element of the above embodiments is effective as an embodiment of the invention. Further, various modifications, such as design modifications, can be made with respect to the above embodiments based on the knowledge of those skilled in the art, and an embodiment with such a modification could fall within the scope of the present invention. Hereinafter, such examples will be described.

In a variation, the braking control apparatus 100 is provided in a four-wheel-drive vehicle. The vehicle is provided with the front-wheel motor for driving the front wheels and the rear-wheel motor for driving the rear wheels. The brake ECU200 provides the regenerative braking force to each of the front wheels and the rear wheels using the front-wheel motor and the rear-wheel motor. When the regenerative control is to be executed, the brake ECU200 sets the driving wheel target pressures, i.e., the right front wheel target pressure, the left front wheel target pressure, the right rear wheel target pressure, and the left rear wheel target pressure, based on the execution of the regenerative control. The brake ECU200 sets the target pressure gradient for each of the wheel cylinder pressures in the right front wheel, the left front wheel, the right rear wheel, and the left rear wheel. The brake ECU200 controls each of the wheel cylinder pressures by setting the rotation frequency of the first motor 11 or the second motor 12 so as to match it with the wheel having a larger target pressure gradient of two system wheels.

For example, when the target pressure increase gradient in the right front wheel is 10 MPa/s and that in the left rear wheel is 5 MPa/s, the two wheels being system wheels with each other, the brake ECU200 sets the rotation frequency of the first motor 11 so as to increase the wheel cylinder pressure in the right front wheel by the target pressure increase gradient in the right front wheel to close the fluid pressure regulating valve SLFR. On the other hand, the brake ECU200 executes feedback control of the opening degree of the fluid pressure regulating valve SLRL so as to increase the wheel cylinder pressure in the left rear wheel by the target pressure increase gradient in the left rear wheel. Thereby, it becomes possible to suitably change the wheel cylinder pressures in accordance with each of the target pressure gradients.

In another variation, a first pressure increasing valve is provided between the connection point of the pipe channels H1 and J1, and the pump 7. Also, a second pressure increasing valve is provided between the connection point of the pipe channels H2 and J2, and the pump 8. Further, a third pressure increasing valve is provided between the connection point of the pipe channels I3 and J3, and the pump 9. Still, a fourth pressure increasing valve is provided between the connection point of the pipe channels I4 and J4, and the pump 10.

The brake ECU200 controls the opening/closing of both the fluid pressure regulating valve SLFR and the first pressure increasing valve so as to make the fluid pressure in the wheel cylinder 6FR approach the right front wheel target pressure, and controls the opening/closing of both the fluid pressure regulating valve SLRL and the second pressure increasing valve so as to make the fluid pressure in the wheel cylinder 6RL approach the left rear wheel target pressure. Also, the brake ECU200 controls the opening/closing of both the fluid pressure regulating valve SLFL and the third pressure increasing valve so as to make the fluid pressure in the wheel cylinder 6FL approach the left front wheel target pressure, and controls the opening/closing of both the fluid pressure regulating valve SLRR and the fourth pressure increasing valve so as to make the fluid pressure in the wheel cylinder 6RR approach the left rear wheel target pressure.

For example, when increasing the fluid pressure in the wheel cylinder 6FR so as to approach the right front wheel target pressure, the brake ECU200 increases the fluid pressure in the wheel cylinder 6FR by closing the fluid pressure regulating valve SLFR and by adjusting the opening degree of the first pressure increasing valve. For example, when decreasing the fluid pressure in the wheel cylinder 6FR so as to approach the right front wheel target pressure, the brake ECU200 decreases the fluid pressure in the wheel cylinder 6FR by closing the first pressure increasing valve and by adjusting the opening degree of the fluid pressure regulating valve SLFR.

In such a braking control apparatus, in the case where the right front wheel target pressure is smaller than or equal to the first reference pressure when the second pressure increasing valve is to be closed and the fluid pressure regulating valve SLRL is to be opened to decrease the fluid pressure in the wheel cylinder 6RL so as to approach the left rear wheel target pressure, the brake ECU200 reduces the driving force or rotational speed of the first motor 11. Also, in the case where the left front wheel target pressure is smaller than or equal to the first reference pressure when the fourth pressure increasing valve is to be closed and the fluid pressure regulating valve SLRR is to be opened to decrease the fluid pressure in the wheel cylinder 6RR so as to approach the right rear wheel target pressure, the brake ECU200 reduces the driving force or rotational speed of the second motor 12.

In this case, the first reference pressure may be zero MPa and the second reference pressure may be zero MPa. In addition, the brake ECU200 may turn off the first motor 11 instead of reducing the driving force or rotational speed thereof. Also, the brake ECU200 may turn off the second motor 12 instead of reducing the driving force or rotational speed thereof. Thereby, even in a braking control apparatus in which a pressure increasing valve is provided between the pump and the wheel cylinder, an influence on the wheel cylinder pressure in the system wheel, occurring when the wheel cylinder in any one of wheels is being reduced, can be suppressed.

REFERENCE NUMERALS

H1, J1, and SMC1 A CUT-OFF VALVE
SRC1 HOLDING VALVE
H2 and J2 PIPELINE
SMC2 CUT-OFF VALVE
SLFL, SLFR, SLRL, and SLRR FLUID PRESSURE REGULATING VALVE
SRC2 HOLDING VALVE
I3 and J3 PIPELINE
3f RESERVOIR TANK
I4 and J4 PIPELINE
6FL, 6FR, 6RL, and 6RR WHEEL CYLINDER
7, 8, 9 and 10 PUMP
11 FIRST MOTOR
12 SECOND MOTOR
13, 14, 15, 16, 17 and 18 FLUID CONTROL SENSOR
100 BRAKING CONTROL APPARATUS
200 BRAKE ECU

INDUSTRIAL APPLICABILITY

According to the present invention, in a braking control apparatus in which operating fluid is supplied to a plurality of wheel cylinders by using multiple pumps each driven by a common driving source, an influence on the system on one side, occurring due to the fluid pressure control in the other system, can be suppressed while an increase in the size of the apparatus is being suppressed.

The invention claimed is:

1. A braking control apparatus comprising:
    first and second pumps each driven by a common driving source;
    a first fluid channel connecting a first wheel cylinder for generating braking force in a first wheel and the first pump;
    a second fluid channel connecting a second wheel cylinder for generating braking force in a second wheel and the second pump;
    a first control valve provided in a third fluid channel connecting a reservoir for retaining operating fluid and the first fluid channel;
    a second control valve provided in a fourth fluid channel connecting the reservoir and the second fluid channel;
    a target pressure determination means configured to determine each of a first target pressure, which is the target fluid pressure of the first wheel cylinder, and a second target pressure, which is the target fluid pressure of the second wheel cylinder; and
    a wheel cylinder pressure control means configured to supply the operating fluid to each of the first fluid channel and the second fluid channel by operating the driving source, and configured to control the opening/closing of the first control valve so as to make the first wheel cylinder pressure, which is the fluid pressure in the first wheel cylinder, approach the first target pressure, and configured to control the opening/closing of the second control valve so as to make the second wheel cylinder pressure, which is the fluid pressure in the second wheel cylinder, approach the second target pressure, wherein
    in the case where the first target pressure is smaller than or equal to a predetermined first reference pressure when the second control valve is to be opened so as to make the second wheel cylinder pressure approach the second target pressure, the wheel cylinder pressure control means reduces the driving force or rotational speed of the driving source.

2. The braking control apparatus according to claim 1, wherein
    in the case where the first wheel cylinder pressure is to be held when the first pump is being driven by the driving source, the wheel cylinder pressure control means holds the first wheel cylinder pressure by adjusting the opening degree of the first control valve; and in the case where the second wheel cylinder pressure is to be held when the second pump is being driven by the driving source, the wheel cylinder pressure control means holds the second wheel cylinder pressure by adjusting the opening degree of the second control valve.

3. The braking control apparatus according to claim 1, wherein
in the case where the first target pressure is smaller than or equal to the first reference pressure and the absolute value of the target pressure reduction gradient of the second wheel cylinder pressure is greater than or equal to a predetermined value when the second valve is to be opened so as to make the second wheel cylinder pressure approach the second target pressure, the wheel cylinder pressure control means reduces the driving force or rotational speed of the driving source.

4. The braking control apparatus according to claim 1, further comprising a regenerative braking unit configured to generate regenerative braking force in at least the second wheel by regenerative control of an electrical motor, wherein
when the regenerative control is to be executed, the target pressure determination means sets the second target pressure based on the execution of the regenerative control, and wherein
in the case where the first target pressure is smaller than or equal to the first reference pressure when the second control valve is to be opened so as to make the second wheel cylinder pressure approach the second target pressure preset based on the execution of the regenerative control, the wheel cylinder pressure control means reduces the driving force or rotational speed of the driving source.

5. The braking control apparatus according to claim 1, wherein
the wheel cylinder pressure control means reduces the driving force or rotational speed of the driving source by reducing the duty ratio of the current pulse-supplied to the driving source.

6. The braking control apparatus according to claim 1, further comprising a third control valve provided between the first control valve and the reservoir in the third fluid channel, wherein
when it is determined that a predetermined abnormal condition has been satisfied, the wheel cylinder pressure control means closes the third control valve; and when it is determined that the abnormal condition is not satisfied, and in the case where the first target pressure is smaller than or equal to the first reference pressure when the second control valve is to be opened so as to make the second wheel cylinder pressure approach the second target pressure, the wheel cylinder pressure control means opens the first and the third control valves even when the first wheel cylinder pressure is smaller than or equal to the first reference pressure.

7. The braking control apparatus according to claim 1, further comprising a fluid pressure sensor configured to detect the first wheel cylinder pressure, wherein
when the first target pressure is zero and a predetermined correction execution condition is satisfied, the wheel cylinder pressure control means executes zero-point correction for the fluid pressure sensor; and when the driving source is being operated so as to increase the second wheel cylinder pressure toward the second target pressure, the wheel cylinder pressure control means avoids the execution of the zero-point correction for the fluid pressure sensor, assuming that the correction execution condition is not satisfied even when the first target pressure is zero.

8. The braking control apparatus according to claim 1 further comprising:
a first pressure increasing valve provided between the connection point of the first fluid channel and the third fluid channel, and the first pump; and
a second pressure increasing valve provided between the connection point of the second fluid channel and the fourth fluid channel, and the second pump, wherein
the wheel cylinder pressure control means controls the opening/closing of the first control valve and the first pressure increasing valve so as to make the first wheel cylinder pressure approach the first target pressure, and controls the opening/closing of the second control valve and the second pressure increasing valve so as to make the second wheel cylinder pressure approach the second target pressure, and wherein
in the case where the first target pressure is smaller than or equal to the first reference pressure when the second pressure increasing valve is to be closed and the second control valve is to be opened so as to make the second wheel cylinder pressure approach the second target pressure, the wheel cylinder pressure control means reduces the driving force or rotational speed of the driving source.

* * * * *